US012476436B2

(12) United States Patent
Yun et al.

(10) Patent No.: US 12,476,436 B2
(45) Date of Patent: Nov. 18, 2025

(54) SYSTEMS AND METHODS FOR MICRODISK AND MULTIPLET LASER PARTICLES

(71) Applicant: The General Hospital Corporation, Boston, MA (US)

(72) Inventors: Seok-Hyun Yun, Belmont, MA (US); Paul Dannenberg, Cambridge, MA (US)

(73) Assignee: The General Hospital Corporation, Boston, MA (US)

( * ) Notice: Subject to any disclaimer, the term of this patent is extended or adjusted under 35 U.S.C. 154(b) by 296 days.

(21) Appl. No.: 18/044,432

(22) PCT Filed: Sep. 8, 2021

(86) PCT No.: PCT/US2021/049377
§ 371 (c)(1),
(2) Date: Mar. 8, 2023

(87) PCT Pub. No.: WO2022/055938
PCT Pub. Date: Mar. 17, 2022

(65) Prior Publication Data
US 2024/0039241 A1    Feb. 1, 2024

Related U.S. Application Data

(60) Provisional application No. 63/075,468, filed on Sep. 8, 2020.

(51) Int. Cl.
*H01S 5/10* (2021.01)
*G01N 21/64* (2006.01)
(Continued)

(52) U.S. Cl.
CPC ....... *H01S 5/1021* (2013.01); *G01N 21/6486* (2013.01); *G02B 21/0076* (2013.01);
(Continued)

(58) Field of Classification Search
CPC ...... H01S 5/1021; H01S 5/041; H01S 5/1042; H01S 5/1092; H01S 5/0217;
(Continued)

(56) References Cited

U.S. PATENT DOCUMENTS 10,707,649 B2    7/2020  Yun
2005/0195873 A1*  9/2005  Forrest ............... H01S 5/36
                                                              372/39

(Continued)

FOREIGN PATENT DOCUMENTS

WO    WO-2017210675 A1 * 12/2017 ............ G01J 3/0248
WO       2020086510 A1    4/2020

OTHER PUBLICATIONS

"Optical Properties and Light-Emission Device Applications of 2-D Layered Semiconductors", Li et al. Proceedings of the IEEE (vol. 108, Issue: 5, May 2020).*

(Continued)

Primary Examiner — Mohamed K Amara
(74) Attorney, Agent, or Firm — QUARLES & BRADY LLP

(57) ABSTRACT

A first layer, a first spacer layer, and a second layer of a semiconductor wafer can be etched to produce a plurality of columnar structures extending from the substrate layer and including a first optical cavity situated about the first gain medium, a second optical cavity situated about the second gain medium, and a first spacer region contacting the first gain medium and the second gain medium. Also, a photonic microparticle formed from a layered semiconductor wafer and of a columnar structure having a first optical cavity situated about a first gain medium, a second optical cavity situated about a second gain medium, and a first spacer region contacting the first gain medium and the second gain medium. The first optical cavity and the second optical cavity in the photonic microparticle are each capable of (Continued)

generating laser light with a distinct spectral peak when energetically excited.

20 Claims, 27 Drawing Sheets

(51) Int. Cl.
*G02B 21/00* (2006.01)
*H01S 5/04* (2006.01)
*H01S 5/02* (2006.01)

(52) U.S. Cl.
CPC ............ *H01S 5/041* (2013.01); *H01S 5/1042* (2013.01); *H01S 5/1092* (2013.01); *G01N 2201/06113* (2013.01); *G01N 2201/06193* (2013.01); *H01S 5/0217* (2013.01)

(58) Field of Classification Search
CPC ............ H01S 2301/176; H01S 5/4087; H01S 3/1628; H01S 3/169; H01S 5/1075; G01N 21/6486; G01N 2201/06113; G01N 2201/06193; G01N 21/63; G02B 21/0076; G02B 21/0064
See application file for complete search history.

(56) References Cited

U.S. PATENT DOCUMENTS

| | | | |
|---|---|---|---|
| 2005/0195874 A1* | 9/2005 | Forrest | H01S 5/026 372/39 |
| 2008/0204709 A1* | 8/2008 | Kiesel | B82Y 20/00 356/36 |
| 2009/0276923 A1 | 11/2009 | Sumetsky | |
| 2011/0266470 A1* | 11/2011 | Yun | C09K 11/06 250/580 |
| 2015/0102465 A1 | 4/2015 | Chen et al. | |
| 2017/0199036 A1* | 7/2017 | Moxley, III | G01R 33/0354 |
| 2019/0296521 A1 | 9/2019 | Yun | |
| 2021/0104861 A1* | 4/2021 | Lacomb | H01S 3/0627 |
| 2023/0273503 A1* | 8/2023 | Leo | G02F 1/3513 359/330 |

OTHER PUBLICATIONS

Fikouras et al., Non-Obstructive Intracellular Nanolasers, Nature Communications, 2018, 9(1):4817, pp. 1-7.
Martino et al., Wavelength-Encoded Laser Particles for Massively Multiplexed Cell Tagging, Nature Photonics, 2019, 13(10):720-727.
Tien et al., Heterogeneous Integration of InGaAsP Microdisk Laser on a Silicon Platform Using Optofluidic Assembly, Applied Physics A, 2009, 95:967-972.
PCT International Search Report and Written Opinion, PCT/US2021/049377, Feb. 1, 2022, 12 pages.
Athanasiou, M., et al. "Monolithically multi-color lasing from an InGaN microdisk on a Si substrate." Scientific Reports 7.1 (2017): 10086.
Dannenberg, Paul H., et al. "Multilayer fabrication of a rainbow of microdisk laser particles across a 500 nm bandwidth." ACS Photonics 8.5 (2021): 1301-1306.
Hsing, J. Y., et al. "Vertically coupled double-microdisk lasers composed of InGaAs quantum dots-in-a-well active layers." Journal of Applied Physics 121.20 (2017).
Kwok, Sheldon JJ, et al. "Multiplexed laser particles for spatially resolved single-cell analysis." Light: Science & Applications 8.1 (2019): 74.
Liapis, Andreas C., et al. "Free-standing III-V Semiconductor Microdisk Laser Particles." CLEO: QELS_Fundamental Science. Optica Publishing Group, 2018.
Tu, Xin, Yi-Kuei Wu, and L. Jay Guo. "Vertically coupled photonic molecule laser." Applied Physics Letters 100.4 (2012).
Yin, Chenxuan, et al. "Vertically Stacked Silicon Nitride Coupled Microdisk Resonators." Asia Communications and Photonics Conference. Optica Publishing Group, 2015.
Extended European Search Report in European Application No. 21867484.4; received on Dec. 3, 2024.

* cited by examiner

SYSTEMS AND METHODS FOR MICRODISK AND MULTIPLET LASER PARTICLES

CROSS-REFERENCES TO RELATED APPLICATIONS

The present application represents the U.S. National Stage Entry of International Patent Application Ser. No. PCT/US2021/049377, filed Sep. 8, 2021, which is based on, claims priority to, and incorporates herein by reference, U.S. Provisional Application Ser. No. 63/075,468, filed Sep. 8, 2020, and entitled, "SYSTEMS AND METHODS FOR MICRODISK AND MULTIPLET LASER PARTICLES."

STATEMENT REGARDING FEDERALLY SPONSORED RESEARCH

This invention was made with government support under ECCS-1505569 awarded by the National Science Foundation, and under NIH/EB024242 awarded by the National Institutes of Health. The government has certain rights in the invention.

BACKGROUND

This present disclosure generally relates to lasers that can be embedded into, implanted in, injected into, or otherwise disposed with samples such as biological cells and tissues. More particularly, the present disclosure relates to optically excitable laser particles made of organic and inorganic materials, and the fabrication, functionalization, delivery, and imaging of the laser particles, and their use as probes for massively parallel imaging, sensors, and assays.

Fluorescent probes, such as dyes, fluorescent proteins, and quantum dots, have become important tools in biomedical imaging, cell sorting, immuno-histology, high-throughput screening, and numerous other biochemical measurements. Although these luminescent probes are immensely useful, their relatively broad emission spectra, such as 30-100 nm, limit the number of probes that can be simultaneously used without ambiguity and often make their spectra indistinguishable from the background emission of endogenous molecules in tissues. Conventional fluorescence microscopes are equipped to resolve 3 to 4 dyes, and state-of-the-art cytometry is limited to eleven channels. Multiplexing four different dyes can give 16 ($=2^4$) combinations. Simultaneous expression of three genes encoding blue, green, and red fluorescent proteins at different ratios in cells, as in Brainbow and RGB marking, can generate hundreds of colors. However, the transfection is stochastic, and the fidelity of color reading is prone to noise. To date, the number of fluorescence colors for imaging has been limited to less than, for example, a dozen.

It is fundamentally challenging to engineer fluorophores for much narrower emission linewidth because of the quantum-mechanical broadening of the electronic levels in molecules. The irregular shapes and thermodynamic fluctuations result in spectral broadening of emission from semiconductor quantum dots. The attenuation of plasmonic electron oscillations in metallic nanoparticles result in emission widths of >50-100 nm. By comparison to these electronic resonance, optical resonance offers effective approaches to generate narrow emission lines. A laser is a great example. By placing fluorophores and semiconductor materials inside an optical cavity, an extremely narrow spectral line can be produced. The output of a single-frequency laser can be a millionth of nanometer in wavelength, tunable over the entire gain width by changing the cavity resonance.

One potential technology that overcomes these limitations is to use microparticles, termed laser particles (LPs) that emit extraordinarily narrowband radiation (<1 nm linewidth). LPs include a gain material embedded within an optical resonator of high refractive index. An external energy source, such as an optical pump excites the gain medium, causing a population inversion within the medium that can lead to a positive cycle of optical feedback, via stimulated emission, that results in the confinement and emission of laser light. The wavelength at which an LP emits is dominated by two factors. The first is the chemical composition of the gain medium, which coarsely defines the wavelength range at which the material can radiate. For a material such as indium gallium arsenide phosphide (InGaAsP), this range can be approximately 100 nm for given relative compositions. Within each 100-nm band, laser emission can have different emission wavelengths, which are determined by finely tuning the radius of each LP. For a given radius, the resonance condition of the cavity will be satisfied at particular, discrete emission wavelengths. This enables the emission signature of the particle to take on values that are determined by a continuous variable: the particle's radius. This recently discovered technology has enabled approximately 400 particles of different emission wavelength to be simultaneously resolved using five different materials. However, since recent studies in the field of single cell analysis typically use thousands to tens of thousands of cells, the tagging ability of these prior laser particle-based technologies are still incapable of sufficiently handling many tagging applications.

Relatedly, the semiconductor industry's ability to fabricate nano- and micro-structures, including laser particles, has revolutionized society, producing technologies ranging from integrated circuits to quantum dots. The popularity of these structures often stems from their electro-optical properties: for example, electronic band gaps at visible and near infrared frequencies, and high refractive indices which enable optical confinement. Modern semiconductor growth techniques can be used to produce epitaxial films of compound semiconductors, which comprise of mixtures of multiple chemical elements whose ratios can be varied during the crystal growth process to tune the properties of the resultant material across a continuum of values. However, growth of a monocrystalline compound whose size exceeds more than a few inter-atomic distances must typically take place in a multistep fashion on a pre-existing semiconductor crystal. Historically, these growth conditions have restricted the use of structures fabricated from these semiconductor films to on-chip applications, in which the resulting structures operate in-situ, on top of the original growth substrate. More recently, it has become possible to remove these structures from their native growth environment, transferring them into a liquid suspension. This fabrication process has allowed the incorporation of structures such as semiconductor microdisk lasers into a variety of novel environments including biological tissues, where they have been used to successfully tag cancer cells with individual identifiers, readable using a recently developed imaging technique, known as laser particle stimulated emission microscopy.

As touched on above, the primary advantage of laser particles (LPs) stems from their emission spectra which can be exceptionally narrowband: frequently exhibiting a full-width at half maximum of less than 1 nm, more than an order of magnitude better than a typical fluorescent dye. This property is achieved by first confining light emitted from the particle in a high refractive index cavity of dimensions ranging from a few hundred nanometers to a few microns. At one or more discrete wavelengths the cavity's resonance condition will be satisfied, resulting in a buildup of optical power inside a cavity mode which will subsequently radiate this power at the resonating wavelength. The narrow emission linewidth enables several hundred distinct particles to be simultaneously resolved without ambiguity caused by spectral overlap. This makes LP technology exceptionally well suited to applications involving the tagging and tracking of individual cells.

Unfortunately, one current limitation stems from a lack of scalability of semiconductor microdisk-based LP technology. Previous studies which have fabricated semiconductor microdisk lasers for direct transfer into liquid suspension have used only a two-dimensional fabrication process in which each of the laser cavities produced arises from the same epitaxial layer. Practically speaking, this limits the number of LPs that can be produced to ~$10^7$ per $cm^2$ of wafer (assuming each particle is approximately 2.5 μm in diameter), which falls far short of quantities that can be obtained using alternative particle technologies such as dyed latex microspheres which have typical concentrations of ~$5 \times 10^9$ particles/mL (assuming 2.5% solids-suspension). One method to increase production volume of microdisk laser LPs is therefore to use a larger surface area of wafer. However, III-V type semiconductors such as indium phosphide on which near-infrared active epitaxial layers are grown can be extremely expensive.

Thus, there is a need for new fabrication methods and laser particle constructions having improved tagging abilities that allow an increased number of targets to be simultaneously identified. Additionally, there is a need for new fabrication methods that allow for increased production of laser particles without the challenges and added expense associated with using a larger area wafer.

SUMMARY

The present disclosure addresses the drawbacks of prior laser particle efforts by providing new formation methods, constructions, and systems based, in part, on layered fabrication techniques that can be used to produce numerous single cavity laser particles or to produce multiple cavity laser particles, referred to as multiplet laser particles (mLPs). A variety of fabrication techniques are provided that allow the laser particles to arise from different epitaxial layers in the layered wafer. Several method variations are provided by which singlet laser particles or multiplet laser particles can be fabricated and freed into suspension. Because the singlet laser particles can be produced from a wafer having multiple active layers, the quantity produced can be drastically increased when compared to prior techniques using a similarly sized wafer. The multiplet laser particles disclosed herein can effectively combine multiple singlet laser particles to have unique optical emission properties that allow for the formation of a large quantity, for example thousands to millions, of uniquely identifiable, distinguishable particles. Additionally, techniques that can be leveraged to increase a group of mLP's multiplexing potential by varying their emission wavelengths are provided.

In one aspect, the present disclosure provides a method of making a plurality of photonic microparticles. The method can include a method step of preparing a semiconductor wafer comprising a substrate layer, a first layer positioned above the substrate layer and formed of a first gain medium comprising one or more inorganic materials, a second layer positioned above the first layer and formed of a second gain medium comprising one or more inorganic materials, and a first spacer layer positioned between the first layer and the second layer. The method can also include a method step of etching the first layer, the first spacer layer, and the second layer to produce a plurality of columnar structures, wherein the columnar structures extend from the substrate layer and each includes a first optical cavity situated about the first gain medium, a second optical cavity situated about the second gain medium, and a first spacer region contacting the first gain medium and the second gain medium.

In another aspect, the present disclosure provides a photonic microparticle. The microparticle can include a columnar structure comprising a first optical cavity situated about a first gain medium, a second optical cavity situated about a second gain medium, and a first spacer region contacting the first gain medium and the second gain medium, wherein the first gain medium and the second gain medium are each capable of generating laser light with a distinct spectral peak when energetically excited.

In one aspect, the present disclosure provides a method of making a plurality of photonic microparticles. The method including a method step of preparing a semiconductor wafer comprising a substrate layer, a first layer positioned above the substrate layer and formed of a first gain medium including one or more inorganic materials; a second layer positioned above the substrate layer and formed of a second gain medium including one or more inorganic materials; a first spacer layer positioned between the first layer and the second layer. The method can also include a method step of etching the first layer, the first spacer layer, and the second layer to produce a plurality of columnar structures, wherein the columnar structures extend from the substrate layer and each includes a first optical cavity situated about the first gain medium, a second optical cavity situated about the second gain medium, and a first spacer region contacting the first gain medium and the second gain medium. The method can also include a method step of separating the first optical cavity and the second optical cavity from the substrate layer and the first spacer layer.

In another aspect, the present disclosure provides photonic microparticle configured to emit light when energetically excited. The microparticle can include a first optical cavity situated about a first gain medium; a second optical cavity situated about a second gain medium; and a first spacer region contacting both the first gain medium and the second gain medium and having a smaller cross-sectional area than the cross-sectional area of the first optical cavity and the second optical cavity, wherein the first optical cavity and second optical cavity are each configured to generate laser light with a distinct spectral peak when energetically excited, and the spectral peak generated by the first optical cavity is different than the spectral peak generated by the second optical cavity.

In one aspect, the present disclosure provides a system for producing photonic microparticles configured to emit light when energetically excited. The system can include a semiconductor wafer comprising a substrate layer, a first layer positioned above the substrate layer and formed of a first gain medium including one or more epitaxially grown inorganic materials, a second layer positioned above the first layer and formed of a second gain medium including one or more epitaxially grown inorganic materials, and a first spacer layer positioned between the first layer and the second layer.

In another aspect, the present disclosure provides a method of emitting laser light within a biological sample. The method can include placing one or more photonic particles in the biological sample, the photonic particles being configured to emit laser light when energetically excited or stimulated. The one or more of the photonic particles can comprise a first optical cavity situated about a first gain medium, a second optical cavity situated about a second gain medium; and a first spacer region contacting both the first gain medium and the second gain medium, wherein the first optical cavity and second optical cavity are each configured to generate laser light with a distinct spectral peak when energetically excited, and the spectral peak generated by the first optical cavity is different than the spectral peak generated by the second optical cavity.

In one aspect, the present disclosure provides a microscopy system. The microscopy system can include a pump light source, a beam scanner, a spectrometer having a resolution of less than 5 nanometers and an acquisition rate of more than 1 kilohertz, a spectral analyzer configured to distinguish spectral peaks of laser output from broadband background due to fluorescence, and a sample that contains one or more photonic laser microparticles, wherein each microparticle is configured to generate laser light with multiple distinct spectral peaks when energetically excited.

The foregoing and other aspects and advantages of the present disclosure will appear from the following description. In the description, reference is made to the accompanying drawings that form a part hereof, and in which there is shown by way of illustration one or more exemplary versions. These versions do not necessarily represent the full scope of the invention.

BRIEF DESCRIPTION OF THE DRAWINGS

The present disclosure will hereafter be described with reference to the accompanying drawings, wherein like reference numerals denote like elements.

DETAILED DESCRIPTION

Figure 1:
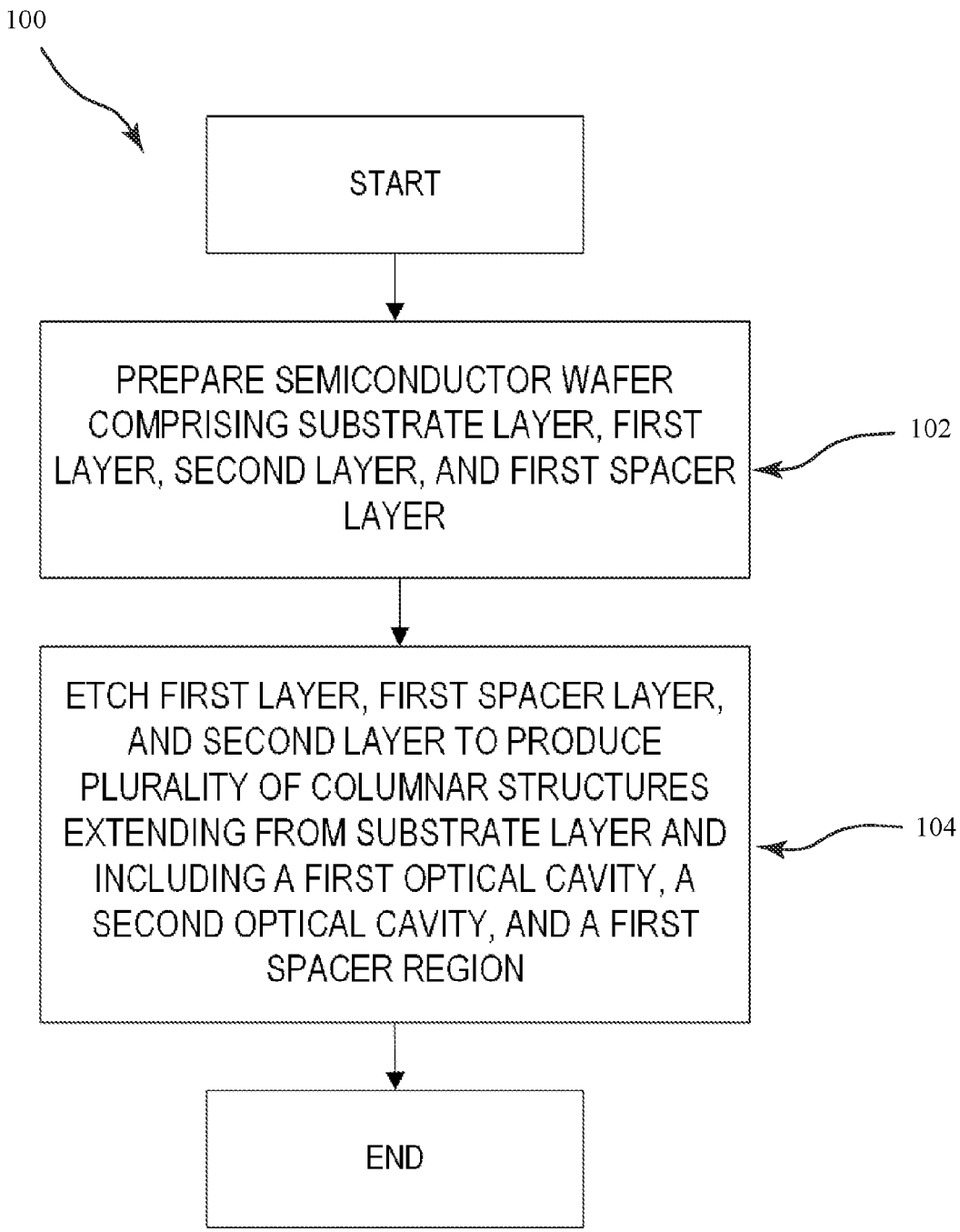
FIG. 1 is a flowchart for a method of making a plurality of photonic microparticles, in accordance with one aspect of the present disclosure.

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

Unless context indicates an alternative meaning, it is noted that the terms "substantially" (as in substantially different from or substantially the same as), "about," "approximately," etc. relative to specified values may indicate appreciably (or not appreciably) different from, within acceptable manufacturing tolerances, and/or without deviation that would significantly impact intended operational parameters. In certain implementations, acceptable values (that are substantially the same as, substantially different from, about, or approximately a specified value) may have, for example, a +/−1 percent deviation, a +/−5 percent deviation, or a +/−10 percent deviation from the specified value, depending on the specific applications. Other acceptable deviations include, for example, at most 1 percent or at most 5 percent (in the case of substantially the same as, about, or approximately), or at least 5 percent or at least 10 percent (in the case of substantially larger/smaller than).

It should be apparent to those skilled in the art that many additional modifications beside those already described are possible without departing from the inventive concepts. In interpreting this disclosure, all terms should be interpreted in the broadest possible manner consistent with the context. Variations of the term "comprising" should be interpreted as referring to elements, components, or steps in a non-exclusive manner, so the referenced elements, components, or steps may be combined with other elements, components, or steps that are not expressly referenced. Embodiments referenced as "comprising" certain elements are also contemplated as "consisting essentially of" and "consisting of" those elements.

Laser particles, as well as their fabrication methods, uses, and associated detection systems and techniques, have been previously described, for example, in U.S. Pat. No. 10,707,649, which is herein incorporated by reference in its entirety. Such prior laser particles are often in the form of a single microdisk laser. The microdisk is made of semiconductor providing optical gain when sufficient optical energy is provided. The microdisk also serves as optical cavity confining optical modes and allowing the cavity modes to get optical gain. The resulting laser emission acts as a spectral signature that, using a high-resolution optical spectrometer, can be used to identify the particle. Since the emission wavelength is stable in time, it can act as a barcode for multiplexing applications and is far more reliable than intensity measurements, which depend on the absorption and scattering properties of all components between the particle emitter and the detector. In its most simple form this barcoding strategy utilizes particles which emit at just a single wavelength $\lambda_{peak1}$, allowing the particle to be identified by just a single parameter: the emission wavelength. Ultimately, the number of distinct barcodes is limited by subtle changes in the emission wavelength, typically due to slight changes in the temperature of the surrounding environment or slow material degradation of the particle over long periods of time. For this reason, only about four hundred simultaneously resolvable particles have been demonstrated in prior research. Theoretically, the number of identifiable particles could be further increased by using even more material compositions capable of emission in different spectral windows. However, this strategy for increasing multiplexing ability would scale only linearly with the number of materials. Therefore, such a strategy would quickly become impractical, since alternate detector systems would need to be introduced to cover the separate wavelength ranges.

In this disclosure, new techniques for rapidly making laser microparticles using a layered semiconductor wafer are presented. In some aspects, the present disclosure involves altering a semiconductor wafer having multiple layers to form vertical stacks of differing material compositions. By then selectively corroding specific layers within each stack, multiple singlet or multiplet laser particles can be released directly into liquid suspension. Each optical cavity in the released laser particles can act as an optical resonator. Thus, the present disclosure demonstrates how a semiconductor wafer having multiple epitaxial layers can be used to form vertical columnar structures of differing material compositions. All disclosed are methods for transferring the microparticles directly into liquid suspension while avoiding particle agglomeration and surface cavity damage both of which impede a laser particle's ability to emit narrowband laser emission.

The improved layered fabrication methods described herein also permit the creation of a laser microparticle having multiple optical cavities, often referred to herein as a multiplet laser article (mLP). In general, the mLPs can include multiple optical cavities with active gain materials, each capable of generating laser light with one or more of the multiple distinct spectral peaks when a pump energy is provided, and spacer regions connecting the multiple optical cavities. Since each cavity can lead to the emission of laser light at one or more wavelengths, the signature complexity is greatly increased compared to a singlet laser particle having just a single cavity. Essentially, an mLP's emission can be described by multiple parameters that denote a cavity's composition $C_i$, and its radius, $R_i$. For m cavities there are 2 m parameters, $C_1, C_2, \ldots, C_m$ and $R_1, R_2, \ldots, R_m$. For example, mLP's with 3 cavities, there are 6 parameters, compared to just 2 parameters for a single (m=1) cavity LP, $C_1$ and $R_1$. Although the present disclosure predominantly describes discoidal cavities, LP's with different shapes, such as ellipsoids and squares, can also be created using the teachings provided herein. Also described are methods to control the emission characteristics of the mLPs particularly for multiplexing applications.

Increased multiplexing capability will enable a paradigm shift in multiplexed analysis. Until now, traditional barcoding strategies have relied on predetermined tagging schemes in which each cell population is tagged with a specific dye. By generating mLPs, the number of tags available could far exceed the number of cells used in a given experiment, meaning that randomized tagging of cells will lead to near-unique identification of every cell, eliminating the need for population based-tags. Furthermore, optical coupling between optical cavities may be introduced deliberately to generate more complex combinations of parameters as a function of C's and R's. Both weak coupling and strong coupling regimes may be used.

In the case of singlet laser particles, the production of particles with at least 9 times increased quantity can be achieved through the use of the layered fabrication technique. This advancement may significantly decrease the associated fabrication cost, complexity, and time to produce laser particles by reducing the size of the growth substrate or the number of batches that need to be performed. In some aspects, the present disclosure provides wafer and microdisk laser designs for direct removal of laser particles originating from different layers in an original semiconductor wafer. There are numerous challenges associated with such a process that the described methods address. For instance, the microdisk lasers may be spatially separated from other laser particles in order to function adequately as resonators and avoid particle agglomeration. Furthermore, the diameter of microdisk lasers, which may be on the order or greater than that of the wavelength of light being confined, can be prone to adhering to other substrates and laser particles due to their relatively large diameter to height ratio. Furthermore, damage to the cavity during the removal of laser particles from their substrate may need to be avoided to ensure the appropriate formation of the optical modes required for laser light emission.

The laser particles described herein can be used in a wide variety of tagging applications, particularly within the biomedical field. For instance, due to their narrow emission spectrum, lasers and optical cavities embedded in cells have great potential for applications in optical tagging of single cells. In particular, cell tagging with multiplet laser particles would allow a user to distinguish between large number of subpopulations of cells or even studying cells at singe-cell level and for highly multiplexed assays.

FIG. 1 is a flowchart for a method 100 of making a plurality of photonic microparticles. The method 100 can include a first step 102 of preparing a semiconductor wafer comprising a substrate layer, a first layer positioned above the substrate layer and formed of a first gain medium comprising one or more inorganic materials, a second layer positioned above the first layer and formed of a second gain medium comprising one or more inorganic materials, and a first spacer layer positioned between the first layer and the second layer. The method 100 can also include a second step 104 of etching the first layer, the first spacer layer, and the second layer to produce a plurality of columnar structures, wherein the columnar structures extend from the substrate layer and each includes a first optical cavity situated about the first gain medium, a second optical cavity situated about the second gain medium, and a first spacer region contacting the first gain medium and the second gain medium.

The method step 104 of etching first layer, the first spacer layer, and the second layer may be a dry etching step. The wafer may be lithographically patterned to produce the columnar structures of the epitaxial layers. For example, a pattern of a hexagonal array of circular disks may be applied. Other patterns, such as a rectangular array of elliptic disks, are also possible. The patterning can be done with photolithography using a photomask and appropriate photoresist. A suitable photolithography and etching process known in the art can be used for this method step. The method step 104 may include applying a resist to the top surface of the wafer. For example, the wafer may be patterned by spin-coating with a photo-sensitive resist (e.g. UV-sensitive resist), pre-baked to evaporate residual solvent and, then exposed to light (e.g. UV light). A post-exposure bake can then be performed and followed by resist development. Such a patterned resist can then be used to mask specific areas, protecting them from attack in a subsequent etching step. This etching can be performed using a variety of techniques known in the art, including: reactive ion etching, wet chemical etching using one or more etchants, and ion milling to define the columnar structures. If a resist is used, the remaining resist can then be removed (e.g. by $O_2$ plasma, lift-off, or mechanical scrubbing). After removal, additional method steps can then be applied to the produced the columnar structures and arrive at the desired multiplet or laser microparticle product. For instance, in order to form singlet laser particles, the method 100 may further comprise a step of separating the first optical cavity and the second optical cavity from the substrate layer and the first spacer layer. FIGS. 2-14 depict specific processes in accordance with method steps 104 and 104, but also depict additional method steps that can be applied in order to achieve a desired microparticle product.

Figure 2:
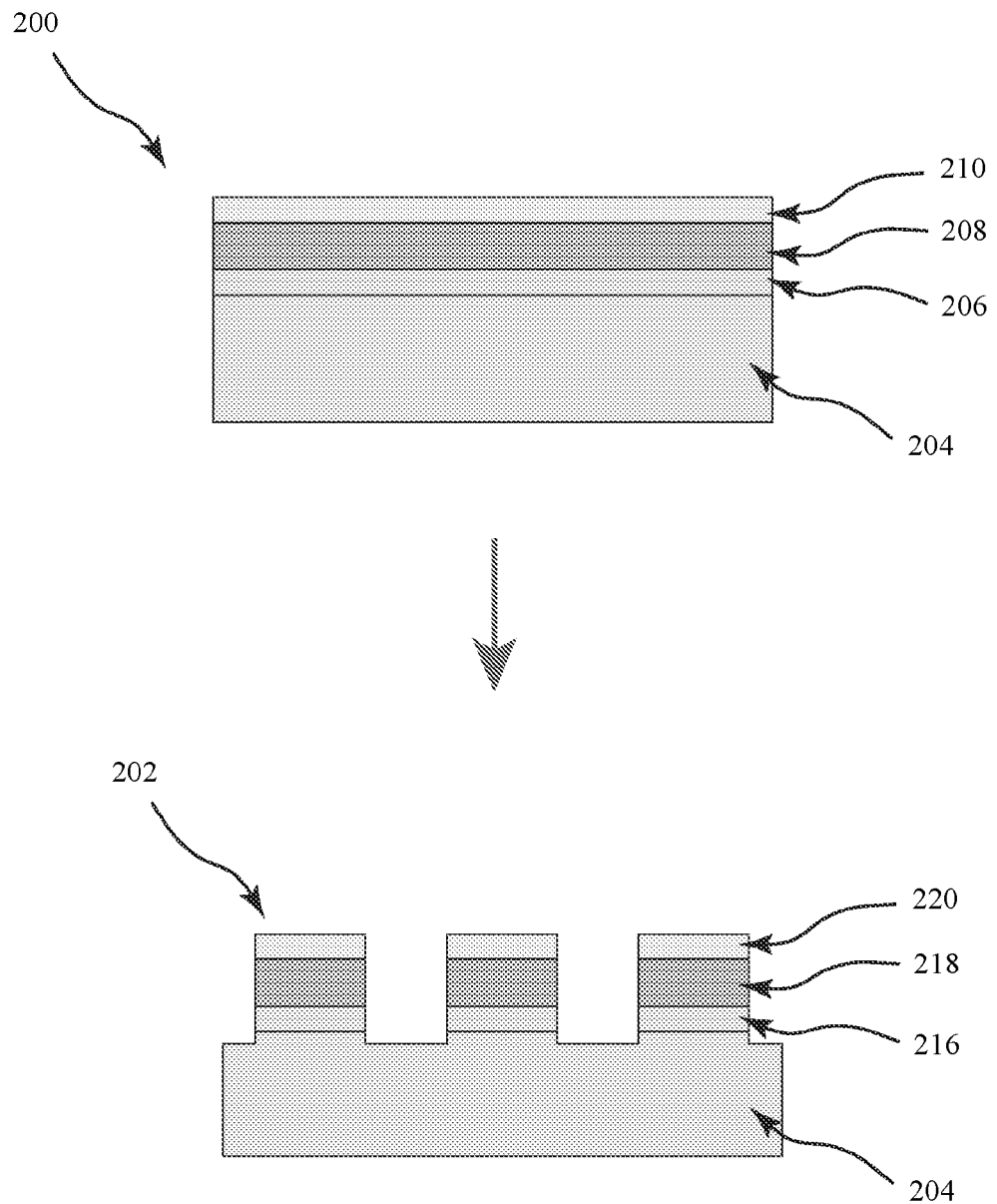
FIG. 2 is a schematic depiction of a process of etching a semiconductor wafer to produce a plurality of columnar structures, each columnar structure comprising multiple material layers.

FIG. 2 shows a schematic depiction in accordance with the method 100 and details the process of etching a prepared semiconductor wafer 200 to produce a plurality of columnar structures 202. In this depiction, the substrate layer 204, the first layer 206, the spacer layer 208, and the second layer 210 are initially positioned on the prepared semiconductor wafer 200. The wafer then undergoes an etching step to form columnar structures 202 that each comprise a first optical cavity 216, a first spacer region 218, and a second optical cavity 220.

In the method 100, the produced first optical cavity and the second optical cavity may each be capable of generating laser light with a distinct spectral peak when energetically excited. In one version, the first optical cavity may generate a different spectral peak than the second optical cavity. For instance, the first gain medium and the second gain medium may have different specific gain spectrums which lead to different distinct spectral peaks. Instead, the first gain medium and the second gain medium have at least one substantially different dimension, such as a cross-sectional area or a diameter. Alternatively, the first optical cavity may be produced in a manner that it generates about the same spectral peak as the second optical cavity. An optical peak may be considered about the same with another peak when it has an overlapping linewidth or when it has a peak wavelength within less than 10 nm, less than 5 nm, less than 3 nm, less than 1 nm, or less than 0.1 nm of the other peak.

With appropriate choice of the gain material and the disk size, as well as pump energy source, each laser microparticle can be capable of generating laser emission with typically one sharp spectral peak. A typical III-V semiconductor microdisk particle can have a diameter between 0.5 to 3 µm and a thickness of 0.1 to 0.4 µm. Upon pumping with nanosecond pulses, stimulated emission can occur by whispering gallery mode resonance within the disk. If only a single optical mode is supported by the cavity during lasing, the emission can be described using a single spectral peak wavelength. The simplest barcoding strategy would be to use this wavelength as a signature to track the specific LP. Generally, the lasing wavelength depends most strongly on the composition of the gain material and its dimension. A further increase in parameters affecting lasing wavelength can also be introduced by promoting more complex interactions of the confined optical modes with their surroundings by, for example, adding a surface coating material of variable thickness.

The first spacer region resulting from the method step 104 may comprise an epitaxially grown semiconductor material that has a composition that allows the first spacer region to be selectively etched with respect to the first gain medium and the second gain medium. For instance, the gain material of the first and second layers can be chemically distinguishable from adjacent spacer layers, both above and beneath to allow removal of material in the first and second layers to survive removal of the spacer layers through chemically selective means (e.g. acid wet etching, photo-electrochemical etching). This can advantageously allow the selective etching of the first spacer region without substantially affecting volume or form of the produced optical cavities. For instance, the method 100 may further include a method step of etching the first spacer region to remove the first spacer region, thereby releasing at least the second optical cavity from the columnar structure. A wet etchant technique may be used to etch the first spacer region. Advantageously, in some method versions, the singlet laser particles or multiplet laser particles described herein may be released directly into an aqueous based solution from the substrate, thereby eliminating the need for an intermediary solution. The region of the substrate layer contacting the first optical cavity can also be simultaneously etched in order to release the first optical cavity. Consequently, multiple laser microparticles can be simultaneously formed. Because the method can be applied to wafers having additional spacer layers and gain material layers, large amounts of identical or intentionally non-identical laser microparticles can be simultaneously produced without increasing the area of the wafer.

The method 100 may further include an additional step of reusing the substrate after removing the columnar structures to prepare a new semiconductor wafer comprising the original substrate layer, a new first layer positioned above the substrate layer and formed of a first gain medium including one or more inorganic materials, a new second layer positioned above the new first layer and formed of a second gain medium including one or more inorganic materials, and a new first spacer layer positioned between the new first layer and the new second layer. Prior to forming the new layers on the substrate layer, a preliminary step of removing any columnar structure that re-adheres to the substrate using a wet etchant may be undertaken.

The method 100 may further include an additional step of removing the formed columnar structures from the substrate layer. This step may be undertaken prior to any step involving etching the first spacer region. For instance, a wet etchant may be used to remove the columnar structures from the substrate layer. Alternatively, mechanical agitation may be used to remove the columnar structures from the substrate layer. The mechanical agitation may include ultrasonication. The columnar structures may be released directly into an aqueous based solution.

Figure 3:
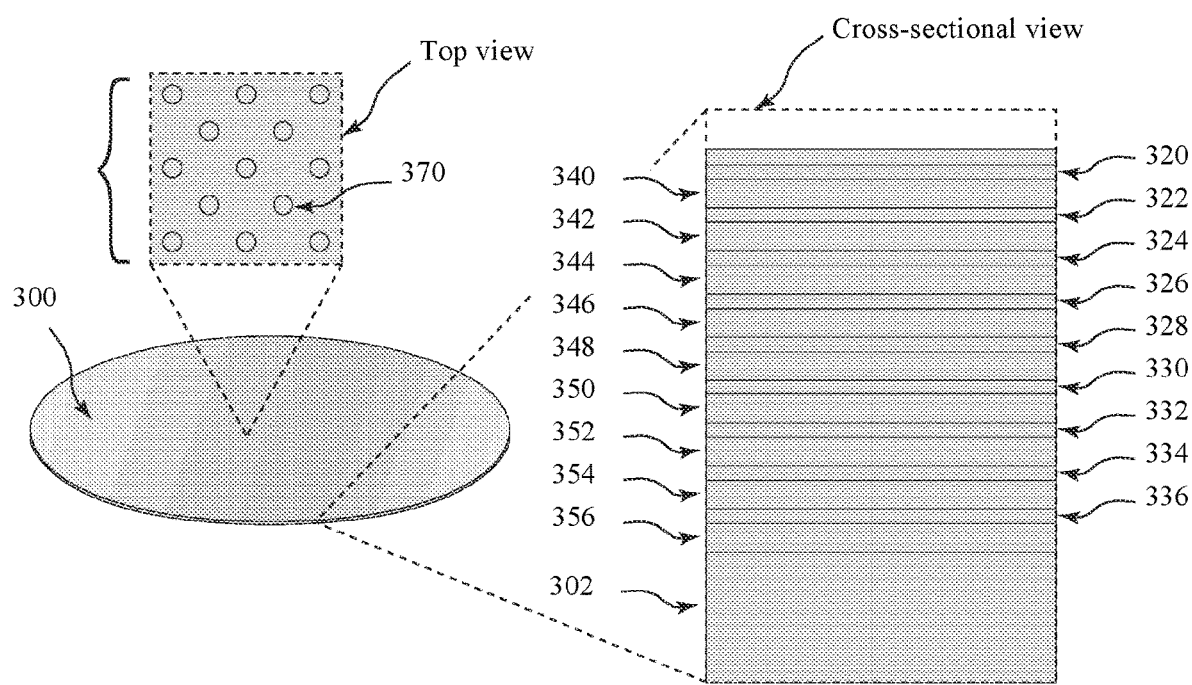
FIG. 3 is a schematic depiction of a semiconductor wafer having multiple layers of a gain material and sacrificial layers made of another material.

FIG. 3 depicts an exemplary multi-layer semiconductor wafer that can be used in accordance with the method 100 for high volume particle fabrication. The wafer 300 includes a substrate 302 which serves as a base layer. In addition to the first layer 336, the first spacer layer 354, and the second layer 334, the wafer 300 also has seven additional epitaxially grown gain layers (320, 322, 324, 326, 328, 330, 332) and eight additional spacer layers (340, 342, 344, 346, 348, 350, 352) including a substrate spacer layer 356. In this depiction, the wafer includes only two distinct types of material. The uniform material of the gain layers may have a desired bandgap wavelength, from which the final particulate product can be uniformly derived. The second material type may form the spacer layers, which can function as sacrificial layers. The depicted substrate 330 may have a substantially identical material to the spacer layers. The substrate and the sacrificial interlayers may each be corroded in a subsequent processing step to allow release of particle structures patterned using the wafer and comprising the first type of material. In accordance with the method step 104, the materials can be selectively etched to form columnar structures 370, as shown in the top view of the depiction.

In the semiconductor wafer of the method 100, the first gain medium and the second gain medium may comprise an epitaxially grown semiconductor material. The first gain medium and the second gain medium may consist essentially of an epitaxially grown semiconductor material. The first gain medium and the second gain medium may include an epitaxially grown semiconductor material. The semiconductor material may be InGaAsP. The etched semiconductor wafer may have an area of less than about 1000 $cm^2$, less than about 85 $cm^2$, less than about 45 $cm^2$, or less than about 7 $cm^2$.

The method step 102 of preparing the semiconductor wafer may involve an already formed semiconductor wafer. For instance, preparing the semiconductor wafer may simply comprise positioning the wafer in a manner that it can be properly etched. Alternatively or additionally, the method step 102 may include creating the semiconductor wafer, such as by epitaxially forming the first layer, the second layer, and the first spacer layer on the substrate.

The semiconductor wafer may further comprise additional spacer layers and gain layers. For instance, the semiconductor wafer may further comprise a third layer positioned above the second layer and formed of a third gain medium including one or more inorganic materials, a second spacer layer positioned between the second layer and the third layer, a fourth layer positioned above the third layer and formed of a fourth gain medium including one or more inorganic materials, and a third spacer layer positioned between the third layer and the fourth layer. Consequently, the method 100 may further include etching the third layer, the third spacer layer, and the fourth layer to produce a plurality of columnar structures, wherein the columnar structures extend from the second spacer layer and each includes a third optical cavity situated about the third gain medium, a fourth optical cavity situated about the fourth gain medium, and a third spacer region contacting the third gain medium and the fourth gain medium. The added method step of etching the third layer, the third spacer layer, and the fourth layer may occur prior to the method step of etching the first layer, the first spacer layer, and the second layer. Alternatively, all layers of the semiconductor wafer except the substrate layer may be simultaneously etched to produce a plurality of columnar structures, wherein the columnar structures extend from the substrate layer and each includes a first optical cavity, a first spacer region, a second optical cavity, a second spacer region, a third optical cavity, a third spacer region, and a fourth optical cavity. After forming the columns, the method 100 may include additional step of etching the second spacer region to remove the second spacer region, thereby releasing at least the third optical cavity, a third spacer region, and a fourth optical cavity from each columnar structure. With this additional step, a multiplet laser particle can be selectively released from the columnar structure. Alternatively, the method 100 may include an additional step of etching the first spacer region, the second spacer region, and the third spacer region to remove the first spacer region, the second spacer region, and the third spacer region, thereby releasing at least the second optical cavity, the third optical cavity, and the fourth optical cavity as singlet laser particles from the columnar structure.

Figure 4:
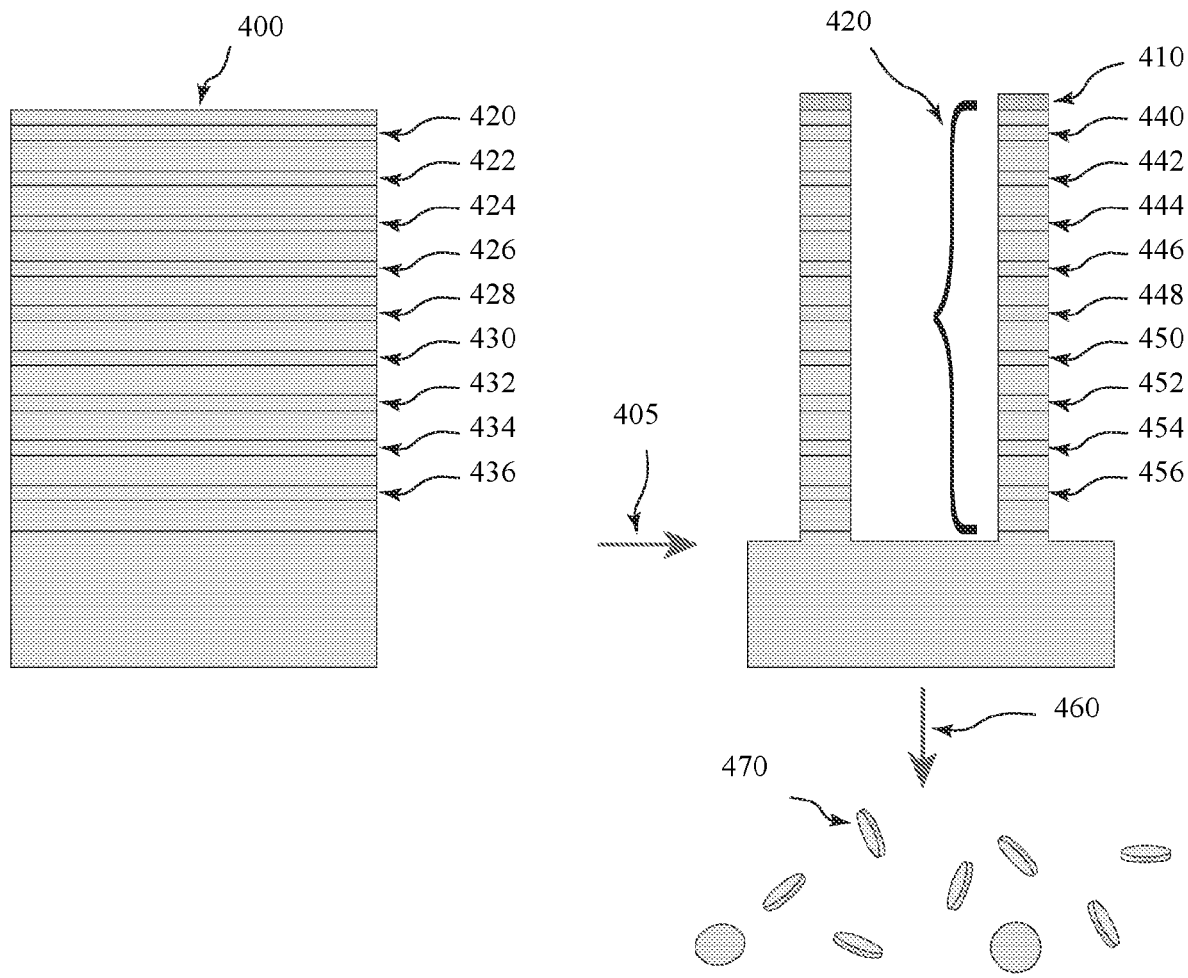
FIG. 4 is a schematic depiction of a process of etching a semiconductor wafer to produce a plurality of microparticles.

FIG. 4 shows how a single wafer substrate, similar to the wafer depicted in FIG. 3, can be etched in accordance with the method 100 to simultaneously produce multiple similar or different types of microparticles, each of which originate from the gain layers (420, 422, 424, 426, 428, 430, 432, 434, 436) within the original epitaxially grown semiconductor. The depicted wafer 400 can undergo an etching step 405 with the help of patterned photoresist masks (410), resulting in an array of columnar structures (420). By removing the sacrificial layers and possibly corroding the substrate as well using selective chemical etching (460), the gain elements (440, 442, 444, 446, 448, 450, 452, 454, 456) in the form of disks in this depiction, are freed from both the wafer and from each other resulting in the generation of a larger number of microdisk laser particles 470, which can be contained in liquid suspension. The laser particles can then be collected, filtered, and stored for later use.

Figure 5:
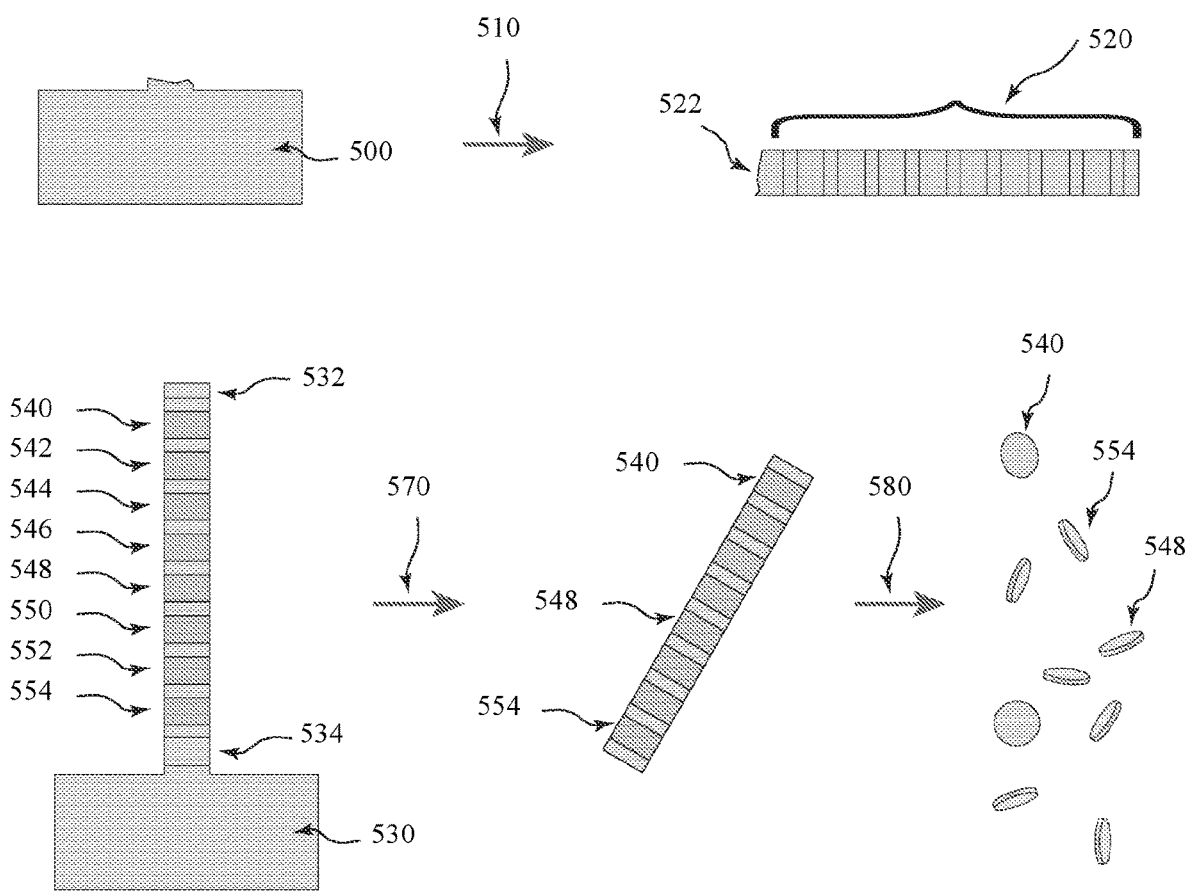
FIG. 5 is a schematic depiction of a process of removing columnar structure from a substrate layer to produce a plurality of microparticles, each columnar structure comprising multiple material layers.

FIG. 5 depicts a variation of the process depicted in FIG. 4, wherein the columnar structures 520 may be removed from the wafer 500 prior to wet etching the individual spacer layers. For instance, a mechanical agitation step 510 using adhesive tape stripping or ultrasonication can be used to remove the columnar structures 520 from the substrate 500. Then, selective etching of the spacer regions may be applied to produce the microparticles. Alternatively shown in FIG. 5, the spacer layers (540, 542, 544, 546, 548, 550, 552, 554, 556) between the gain layers can be composed of different material than the substrate layer 530, thereby providing different etching properties. Then, the chemical etching process can include multiple sequential etch steps. First, an etchant selective to the substrate and outer-most sacrificial materials may be used in an initial step 570 to detach the columnar structures 520 from the substrate 530. Then, a second etchant may be used in another step 580 to separate the individual laser microparticles (e.g. 540, 548, 554) from each other by corroding the sacrificial spacer interlayers.

Yet more different compositions of sacrificial spacer layers may be used, allowing only some of the laser particles to be separated at a single time (i.e. those joined with the layer composition selectively attacked by a user specified etchant). Completion of this step can result in particles being released from the surface of the substrate and becoming freely suspended in an etchant solution. This step can be aided using mechanical agitation (e.g. by ultrasonication). The original wafer can then be reused for further epitaxial growth, potentially after a round of chemical mechanical polishing, or etching to flatten the surface.

One advantage of the mechanical removal of columns is to increase the etchant's ability to effectively wet the deeper lying layers. For instance, if the initial removal of columns with a high aspect ratio is performed by mechanical means (e.g. by ultrasonication) snapping the columns off the substrate, then once the columns have been mechanically detached from the substrate and suspended in liquid, a wet etchant can be introduced that corrodes the sacrificial interlayers, splitting the columns into individual LPs. To prevent particles sticking to each other immediately during/following separation, several techniques may be applied. The etching process can be performed under agitation (e.g. shaking, ultrasonication etc.). Furthermore, increasing the thickness of spacer layers can decrease the probability of adjacent particles agglomerating. Agglomeration can be further reduced using suitable surfactants. If necessary, following release of the particles into liquid suspension, a further round of ultrasonic agitation can be used to separate the particles.

Figure 6:
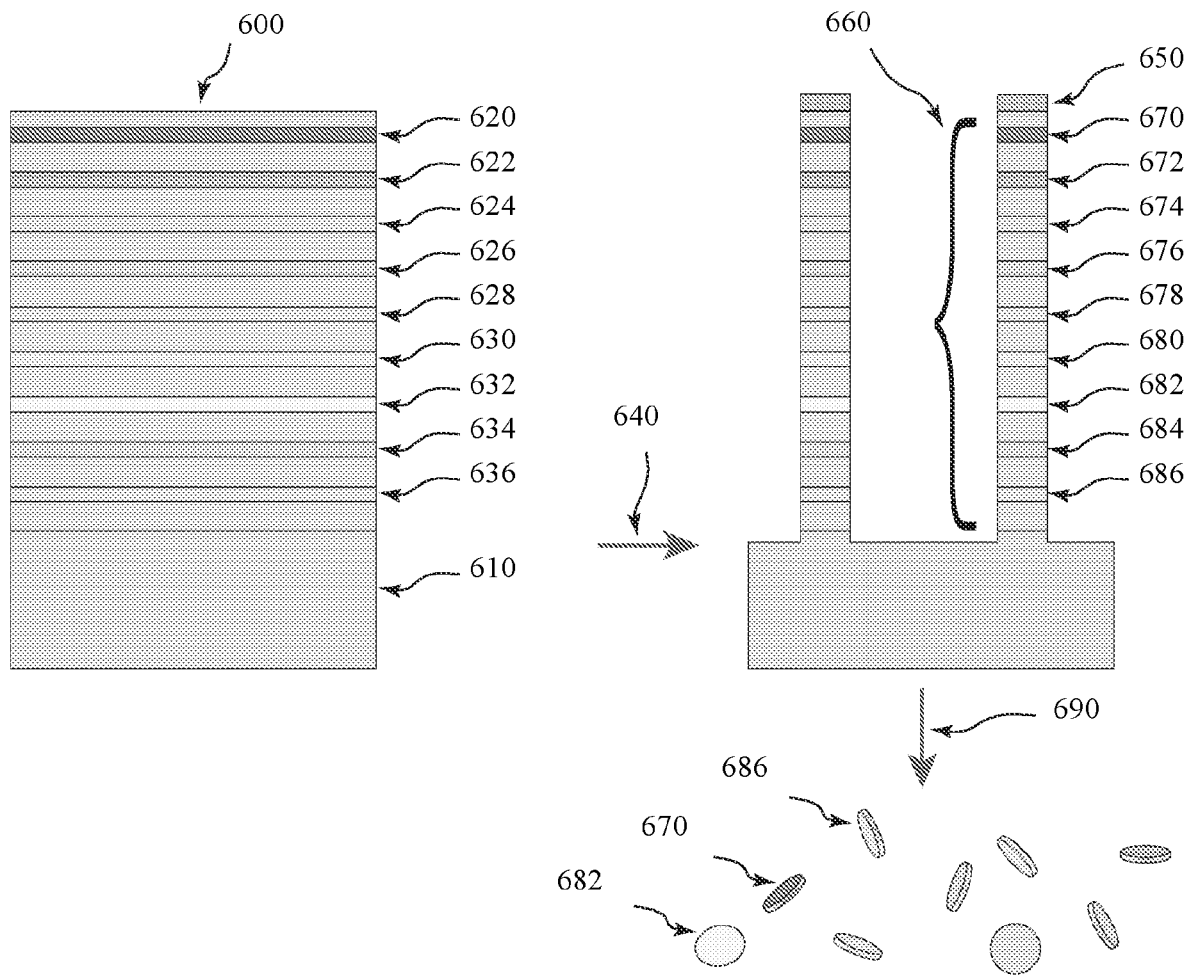
FIG. 6 is a schematic depiction of a process of etching a semiconductor wafer to produce a plurality of microparticles having different material compositions.

FIG. 6 shows another schematic of a process for producing laser particles over a broad spectral range with high yield from a single wafer. The wafer 600 includes multiple epitaxially grown layers on a substrate 610, but instead of using an identical gain material for all gain layers as in the process of FIG. 4, different gain layers (620-636) are composed of different semiconductor materials with different bandgap wavelengths. After lithography and dry etching on the wafer 600, an array of columns 660 containing laser disk elements (670-686) are produced. Selective wet etching of sacrificial layers can then result in laser particles (e.g. 670, 682, 686) with different lasing spectral peaks.

Many of the methods described herein rely on freeing multiple laser microparticles from a wafer that has been patterned and subsequently etched. For such a case, assuming sufficiently thick epitaxially grown layers, the number of laser microparticles that can be produced is proportional to the number of layers that can be etched. For instance, an exceptionally deep etch can produce more laser particles from more layers spanning a thickness of many microns.

There are several factors that can limit the overall etching depth, and therefore the number of particles that can be produced from a single substrate. First, if a mask (e.g. photoresist) is used to define the columnar structure patterns, the mask can be slowly eroded by the etching process. Furthermore, deeper etching can result in surface damage of the defined structures through ion bombardment and/or chemical attack. Ultimately, this damage can increase sidewall roughness which degrades the quality of the microparticles formed by increasing surface induced scattering of the confined optical modes. This complication can in turn leads to broader emission linewidths and larger thresholds, $P_{th}$. In addition, any deviation from perfect verticality during etching may lead to microparticles of undesirable different sizes. Since the number of possible emission modes of each particle is intrinsically linked to the cavity size, this can lead to the production of microparticles with inconsistent emission properties. For example, since the upper layers are exposed to the etchant for longer, they are more heavily etched and smaller in size, whilst the base may be typically larger. Such a structure would lead to LPs emanating from near the base with smaller lasing thresholds but with higher likelihood of lasing from multiple modes thus adding complexity to optical readout schemes.

Another problem associated with deep etches can be that the sidewall profile of a wet etch process is often relatively isotropic. Once again this leads to some microparticles that are smaller and some larger, where the size is impacted by depth beneath the mask. Consequently, this can pose a practical limitation to generating large amounts of microparticles when more uniform particle size is required. While etching near-perfect 90°-angle sidewalls or adequate sidewall angle between 60° and 120° is possible, it typically requires specialized techniques such as concurrent polymer deposition for sidewall passivation that leads to etch chamber contamination, a lack of process repeatability, and extra steps to remove the polymer from the etched sample. Even with perfectly vertical sidewalls, mask erosion and etch damage can limit the usable epitaxial layer thicknesses from which microparticles can be obtained.

Figure 7:
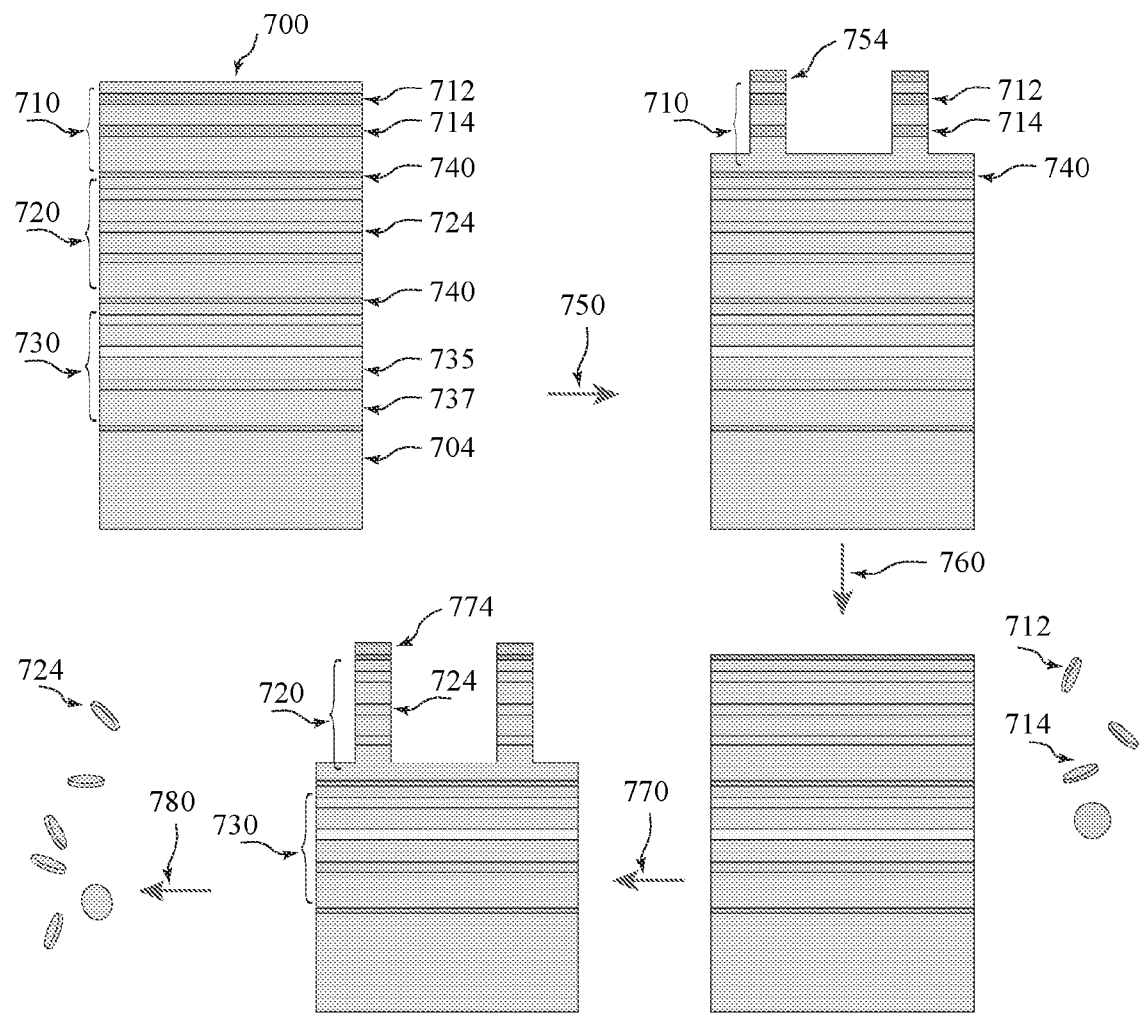
FIG. 7 is a schematic depiction of a process of etching a semiconductor wafer to produce a plurality of microparticles, wherein each columnar structure includes multiple material layers and the etching occurs in multiple steps.

FIG. 7 illustrates a schematic of one potential process that can address these limitations. The process depicted overcomes each of these limitations while retaining the ability to produce a large number of laser microparticles from a single substrate by processing the wafer in multiple patterning and etching cycles, each of which include a relatively shallow etch that may only generates microparticles from a single active layer. For example, microparticles may be obtained from one or multiple gain layers in a single process cycle. The starting multi-layer wafer 700 can have multiple units (710, 720, 730) grown on a substrate 704. Each unit can include gain layers (e.g. 712, 714, 724) and spacer layers (e.g. 735, 737) that can be etched sequentially in separate cycles. In order to accomplish the sequential etching, stop-etch layers (e.g. 740) can be placed between the units (710, 720, 730). Next, a masking layer 754 (e.g. photoresist) can be added to the wafer and patterned during a processing step 750. After the initial etching step, columnar structures 710 containing embedded microparticles (712, 714) or multiplet particles may be fabricated. Through a selective etching step 760 of the spacer layers, the microparticles (712, 714) in the columnar structures 610 can be released into suspension. Similar to the microparticles, the stop etch layers 740 can be resistant to this etchant and therefore create a flat surface after the first round of microparticle removal. Any residual microparticles that happen to adhere to the surface can be removed by another wet etching cycle that selectively corrodes the microparticle. For instance, a mixture of phosphoric acid and hydrogen peroxide can be applied if the microparticles are formed of InGaAsP and potentially the stop etch layer as well. Following this step, another unit 720 can be etched and become ready for processing. The processing of the second unit 720 can include applying the same process using masks 774 to create the columnar structures 720, from which a second set of microparticles 724 can be released. A similar process can then be repeated to produce microparticles from the third unit 730.

By introducing multiple processing cycles, this technique can reduce the etch depth. Consequently, problems associated with mask erosion, sidewall etch damage, and size poly-dispersiveness of the resulting microparticles can be reduced. However, large numbers of microparticles can still be produced by generating particles in the three-dimensional fashion from multiple layers within the starting material. This can result in significant cost savings since fewer substrates are required to produce the same quantity of microparticles. Secondly, this sequential etching technique is compatible with relatively isotropic etch processes for producing columns since the etch need not be deep, especially when etching a single microparticle layer per unit. This technique can allow wet chemical etching to be used to create the columnar structures instead of an anisotropic process such as reactive ion etching. Allowing for the use of wet chemical etching can provide cost savings since alternative anisotropic processes typically require large, sophisticated equipment, hazardous gas sources, and frequent tool maintenance. Furthermore, if only a single layer is processed at a time, fabrication techniques that deposit alternative materials on the surface layer can also be introduced, thereby allowing microparticles fabricated in this manner to be coated on one-side by materials laid down by top-down methods.

Instead of completely removing the spacer layers, the method 100 may further include an additional method step of reducing the volume of the first spacer region through an etching process, wherein the first spacer region still contacts both the first optical cavity and the second optical cavity. Such an etching step usefully allows the spacer region to serve as a pedestal connecting and maintaining a distance between the first optical cavity and the second optical cavity, while also keeping the spacer region from interfering with the laser light generation of the optical cavities. This method step of partially etching the formed spacer region helps allow for the formation of multiplet laser particles. FIGS. 8-13 depict schematics of method steps that can be used in accordance with the method 100 to produce multiplet laser particles. In these exemplary processes, triplet microdisks are created, but it should be recognized that the techniques can be applied to wafers having additional gain layers and spacer layers of various forms.

Figure 8:
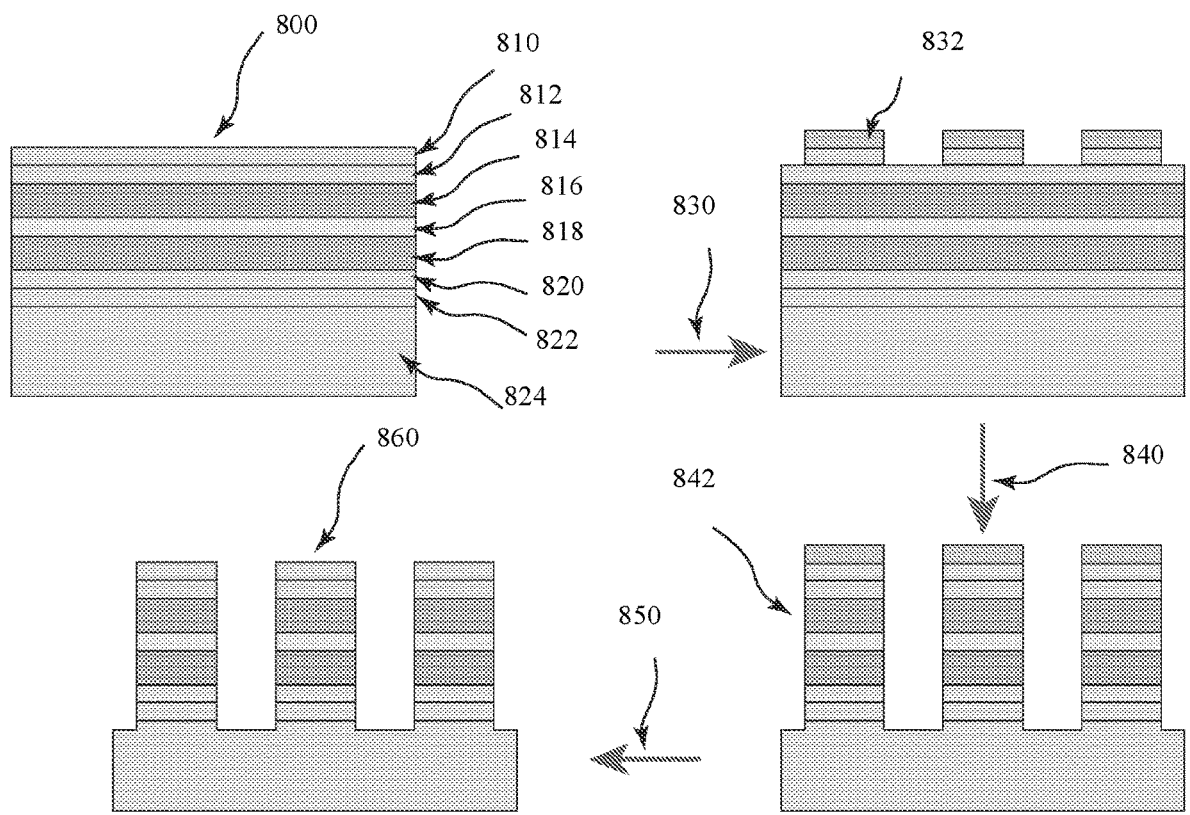
FIG. 8 is a schematic depiction of a process of etching a semiconductor wafer to produce a plurality of columnar structures, each columnar structure comprising multiple material layers.

FIG. 8 depicts a similar technique for first forming the columnar structures as previously described. As with the methods depicted in FIGS. 3 and 5, the starting material in each case can be a wafer 800 having multiple epitaxially layers (810, 812, 814, 816, 818, 820, 822) with specific material compositions grown on a substrate 824. The wafer can contains multiple active layers that form part of resonant cavities and active gain regions (812, 816, 820). Spacer layers (814, 818) can be placed between the active gain regions. Unlike the previously depicted processes, the spacer layers will eventually connect the cavities to form the final multiplet laser particle. As with before, the spacer layers can be selectively etched by, for example, a wet etchant that selectively corrodes it, without significantly damaging the cavity layer. The composition and form of the spacer layer may be chosen so as to not interact with any incident excitation light by ensuring that its bandgap is engineered to prevent interband absorption of the active layers' optical excitation pump. In addition to the spacer layers that will be incorporated into the final microparticles, the wafer 800 may further comprise outer sacrificial layers (810, 822), which can have the same material composition as the substrate 824 and can be eventually wet-etched and removed. The outer sacrificial layers (810, 822) can help facilitate the removal of the eventually formed microparticles, but can also provide additional intermediary benefits. Advantageously, the top sacrificial layer 810 can protect the top active layer 814 during dry etching, and the bottom sacrificial layer 822 can provide high surface quality for the bottom active layer 820. The wafer 800 can be subjected to an initial step 830 of photolithography, in which a photoresist is deposited on the wafer surface. Exposure can define circular patterns 832. Next, a dry etching step 840 can be applied, for example, using reactive ion etching. This step can create columnar structures 842, each of which include optical cavities formed of the gain material and the etchable spacer interlayers. Following the initial etch, the resist may optionally be removed at any subsequent processing step 850 by, for example, using oxygen plasma or partial wet chemical removal.

Figure 9:
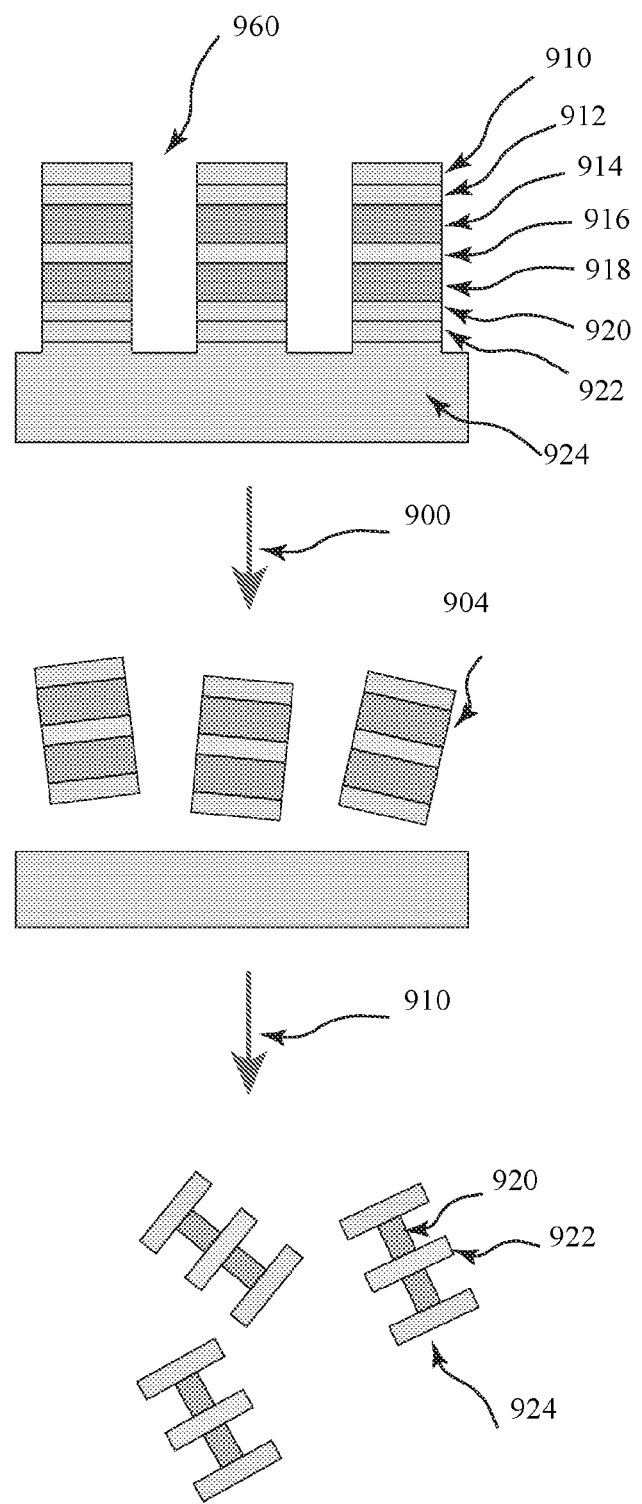
FIG. 9 is a schematic depiction of a process of removing columnar structures from a substrate layer to produce a plurality of multiplet microparticles, each columnar structure comprising multiple material layers.
Figure 10:
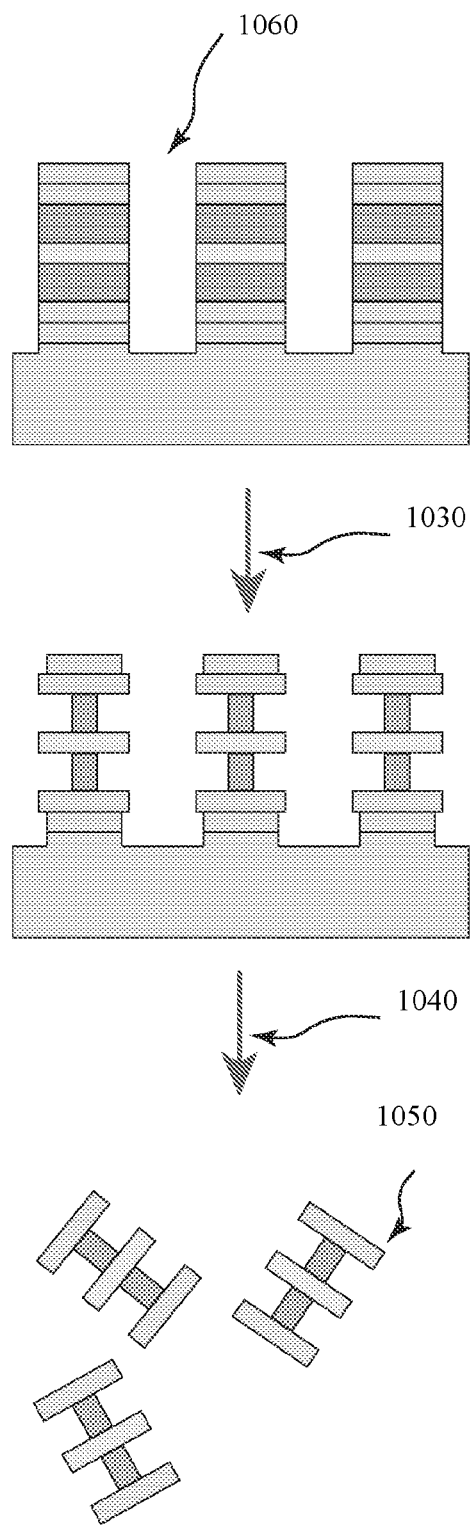
FIG. 10 is a schematic depiction of a process of removing columnar structures from a substrate layer to produce a plurality of multiplet microparticles, each columnar structure comprising multiple material layers.
Figure 11:
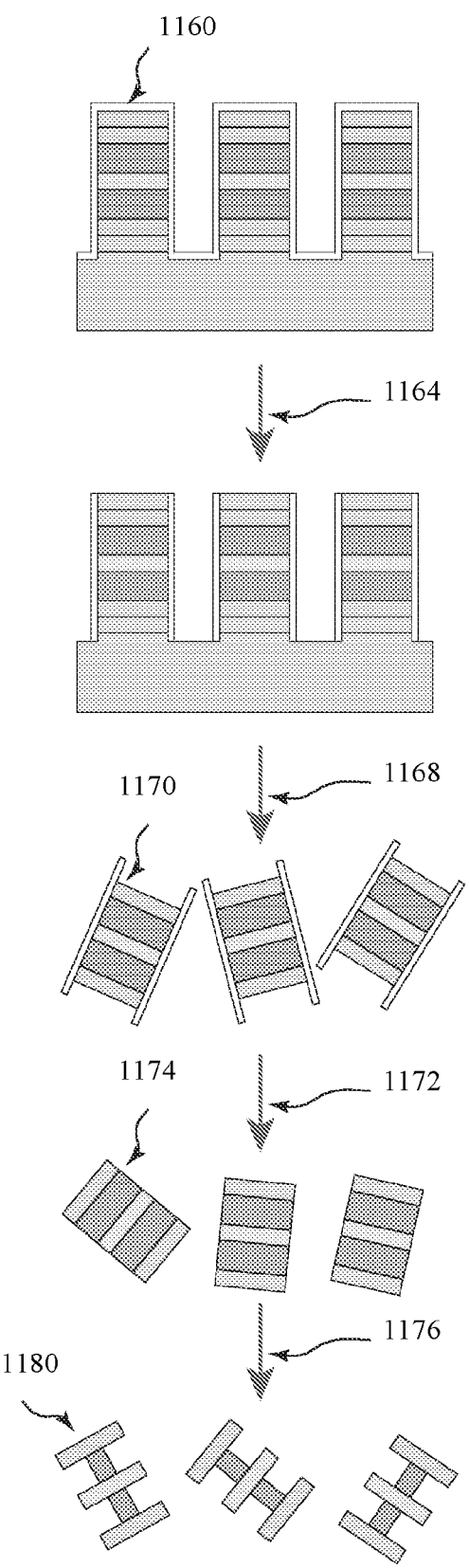
FIG. 11 is a schematic depiction of a process of removing columnar structures from a substrate layer to produce a plurality of multiplet microparticles, each columnar structure comprising multiple material layers.

Following the initial steps of forming the columnar structure, further processes can be applied to reduce the volume of the spacer regions and detach the columnar structures from the substrate. FIGS. 9-11 illustrate several different methods for accomplishing this reduction and detachment. When forming multiplet laser particles as opposed to singlet laser particles, the methods can include two additional steps to the method 100: (i) removal of the multiplet from the substrate and (ii) controlled, partial removal of the spacer layer material between the distinct cavities. Both these tasks can be accomplished with chemical wet etching using appropriate etchants, or by using alternative etching techniques that provide the desired outcome. If applying wet etching techniques, it can be desirable to have the spacer layers (814, 818, 820) and the sacrificial layers (810, 822) have different wet-etching properties; that is, they can have substantially different etching speeds for a given etchant or have different optimal etchants.

FIG. 9 depicts a schematic process wherein the removal of the multiplet from the substrate occurs prior to the controlled, partial removal of the spacer layer material between the distinct cavities. For instance, the dry-etched wafer 960 can be put inside a bath of an etchant that reacts with the sacrificial layers much more aggressively than the spacer layers. With sufficient etching time, the wet etching step 900 could remove the sacrificial layer 822 completely (or remove a part of the substrate 824), while not substantially corroding the cavity material or substantially removing the spacer interlayer material. This step can break off the columnar structures 904 containing both the cavities and relatively intact spacer interlayers. Next, the columns can be exposed to a second etchant step 910 that selectively corrodes the spacer layer material. The etching speed and time can be controlled such that the second etchant partially removes the interlayer material and leaves behind thin spacer layers 920, also referred to as pedestals, connecting adjacent optical cavities. The two etchants used may have entirely separate chemical compositions, or simply include different relative chemical concentrations, or even be used at different temperatures.

FIG. 10 depicts a schematic process wherein the removal of the multiplet from the substrate occurs after the controlled, partial removal of the spacer layer material between the distinct cavities. This 'reversed' scheme can be accomplished by a first step 1030 of selectively etching the spacer interlayers and, following this step, the multiplet 1050 is removed from the substrate by a selective wet etching step 1040 of the sacrificial layers. Each wet etching step need not rely on chemical reactions alone. Rather, it is possible to use electrochemical processes to corrode either the interlayer or the substrate by inducing the formation of carriers at the semiconductor surface (e.g. by impingement of high energy photons) which then react with electrolytes in a surrounding ionic solution. Alternatively, both the spacer layers and the gain layers may be made with the same material composition, but the etching may differ because of geometrical restriction hindering diffusion of etchant and etched materials. Wet etching of high aspect ratio features is typically slower due to inefficient penetration of the etchant. This naturally leads to slower etching of the thin interlayers when compared to the substrate. Therefore, these thin interlayers can be partially removed whilst still achieving complete removal from the substrate in a single step with a single etchant.

FIG. 11 depicts a schematic process wherein an even larger discrepancy of the relative interlayer to substrate etching rate can be achieved by selective, temporary blocking of the etchant's access to the interlayer. A protecting layer 1160 can be achieved by applying a method step of coating the entire patterned surface with a material that is unreactive to the substrate etchant (e.g. photoresist by spray coating or chemical deposition of $C_4F_8$ polymer, $SiO_2$, or the like). In a subsequent step 1164, the protective material may be removed in regions in which it is highly exposed to vertical bombardment from high energy ions, leaving only sidewall coverage intact. In the next step 1168, the substrate material directly beneath the multiplet can then be wholly or partially removed, leaving particles 1170 with the coating material. Any remaining sacrificial or substrate material may be fully removed by using appropriate etchant (e.g. hydrochloric acid). Next, the method can include a step 1172 of removing the protecting layer, leaving the particles 1174 with intact spacer layers. For example, the protective layer can be removed by $O_2$ plasma if a photoresist is used, or by polymer or hydrofluoric acid in the case of $SiO_2$. In the final depicted step 1176, the spacer layers can be partially etched by selective etching, thereby producing final multiplet laser particles 1180. The order of these steps can also be reversed, for example, by partial removal of the interlayer material, followed by addition of the protecting layer, removal from the substrate, and finally an optional removal of the protecting layer. Furthermore, the addition of the protective layer can be incorporated into the initial etching step during which the columnar structures were originally defined by, for example, the addition of polymer forming species into the etch gases during dry etching.

Other possible techniques can be applied to remove the multiplet particles from the substrate without any reliance on chemical reactions. For instance, this could be done by etching the columns containing the multiplet particles to a depth sufficient for mechanical forces, generated by ultrasonication or adhesive tape stripping, for example, to break off columns from the substrate. Stress on the columns can lead to selective snapping at their base and form freestanding columns, unattached to the original growth substrate. The remaining column stub and the interlayers can then be slowly corroded by a selective wet etchant as described above.

Figure 12:
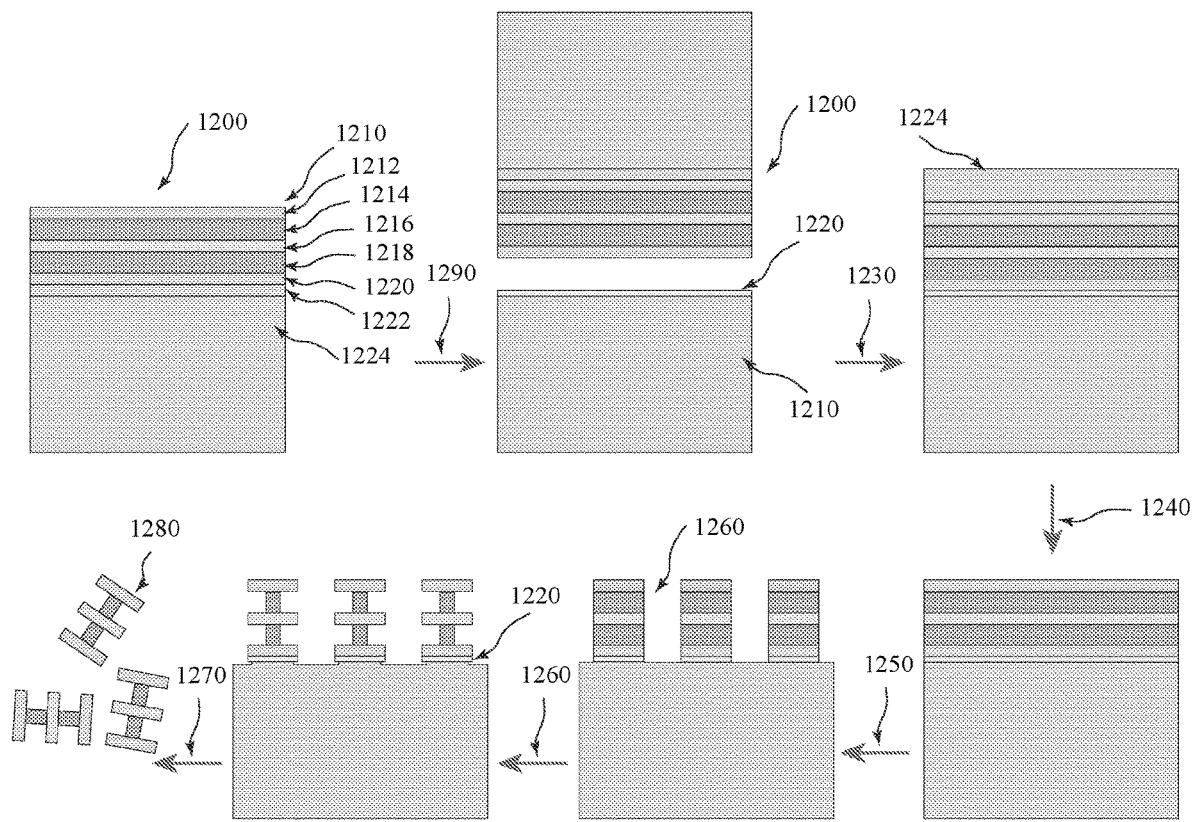
FIG. 12 is a schematic depiction of a process of etching a semiconductor wafer to produce a plurality of multiplet microparticles, wherein the semiconductor wafer is initially bonded to a carrier wafer.

FIG. 12 depicts another schematic process that can be used to prepare multiplet particles. In this configuration, the starting material is the multilayer wafer 1200. In the first step 1290, the wafer 1200 can be brought to a contact to a carrier wafer 1210 via a bonding material 1220 and bonded. The carrier wafer 1210 can serve as a mechanical support for the layers from which the multiplet will be comprised. The wafer bonding step 1230 can be accomplished using a variety of standard bonding processes (e.g. BCB adhesion, eutectic bonding, thermocompression bonding etc.) resulting in the two pieces being firmly joined, with the epitaxially grown layers relatively covered but the substrate 1224 still exposed. In the next steps (1230, 1240), a combination of wafer grinding can be used to thin the backside of the carrier wafer, and using chemical etching, the substrate 1224 and optional sacrificial layer 1222 can be removed. In the next steps (1250, 1260), patterning including lithography and etching of the cavity and spacer layers can be performed to define the overall multiplet shape 1260. Then, in the last step 1270, the bonding material is inactivated or dissolved to release multiplet microparticles 1280. Thus, the method 100 may include a further step of bonding the semiconductor wafer to a carrier wafer, and removing the substrate layer from the bound semiconductor wafer prior to the method step of etching the first layer, the first spacer layer, and the second layer.

One of the advantages of the method variation depicted in FIG. 12 is that the creator is free to choose the bonding layer and carrier wafer material, opening alternative strategies to remove the multiplets by chemical means. For example, polyethersulfone (PES), an adhesive soluble in dimethyl sulfoxide (DMSO), could be used as the bonding material and could be removed by DMSO without attacking the semiconductor materials. Furthermore, unlike the lattice matched epitaxial layers of many common semiconductor materials, PES is highly resistant to acid attack. Therefore, the multiplets can be detached from the carrier wafer by selectively (and thus controllable) attacking the bonding adhesive with DMSO without removing spacer interlayer material. The spacer interlayer material can be corroded, either before or after the releasing the multiplet particle, to form the necessary pedestal in a distinct step using an appropriate acid (e.g. HCl for InP). Consequently, this flip-wafer bonding technique therefore allows a practitioner to separate two of the primary steps in forming the multiplet particle, detachment of the substrate and partial etching of the interlayer, into two independent steps whose chemical processes are mutually orthogonal.

Figure 13:
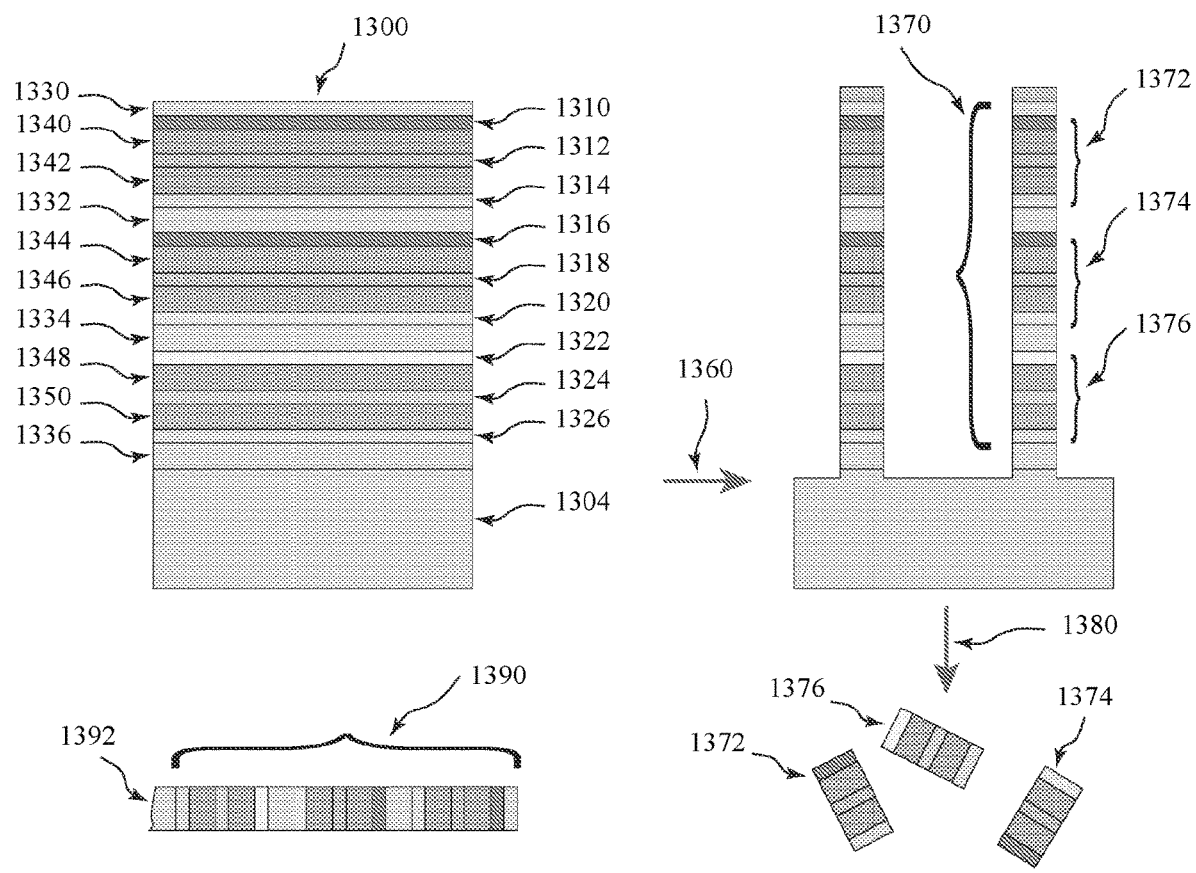
FIG. 13 is a schematic depiction of a process of etching a semiconductor wafer to produce a plurality of multiplet microparticles, wherein multiple multiplet microparticles are created from the each columnar structure.

FIG. 13 depicts another schematic process that can be used to prepare multiplet particles. As shown, the wafer 1300 includes a substrate 1304, epitaxially-grown multiple gain layers (1310-1326), and first-type spacer layers (1330, 1332, 1334, 1336). In addition, the wafer 1300 has second-type spacer layers (1340, 1342, 1344, 1346, 1348, 1350) between the gain layers. The first-type spacer layers may have the same material composition as the substrate 1304, but may differ from the material composition of the second-type spacer layers. As with the above processes, columnar structures 1370 can be produced with during a method step 1360, such as by using lithography and dry etching. Then, a second method step 1380 can be used to remove the first-type spacer layers. For instance, an etchant can selectively target the first-type spacer layers to produce triplet particles (1372, 1374, 1376), each of which has three laser disks separate by the second-type spacer layers in the depicted process. The spacer layers may be then partially etched to minimize optical coupling between the three laser disks within each particle, so as to facilitate lasing of the particle at three spectral peaks. As an alternative method step 1392, prior to the method step 1380, using physical force (e.g. ultrasonication) the columnar structures can be broken at the bottom of the columnar structures to release them from the substrate to produce separate columns 1390. Then, wet etching can be applied to produce the multiplet laser particles.

The use of multiplet laser particles having m cavities each with independent radii is theoretically capable of combinatorically increasing the multiplexing ability of a collection of LPs as described by Equation 1 below. However, this assumes that the radii of each cavity in the collection is uncorrelated with all other radii. One approach to achieve this is therefore to design each cavity to be a slightly different size. For example, if optical lithography is used, a mask with varied feature sizes can be used during patterning. This at least ensures some degree of polydispersity of the cavities subsequently formed. Additionally, the cavity radii can be randomized during the fabrication process. The simplest strategy is to take advantage of nonuniformity in the chosen processing protocol. By measuring the lasing wavelength of a particular cavity, a high-resolution spectrometer can distinguish between changes in a cavity's radius on the subnanometer scale. Therefore, even slight, stochastically induced variations between different particles' geometry can lead to distinguishable multiplets. For example, a thicker resist in one region of wafer during patterning can result in the definition of columns of larger radius after accounting for diffraction of light through the patterning mask and reflow of the resist feature during hard baking is used during lithographic patterning. Variations in resist thickness of a few percent will naturally arise when spin coating especially one a small substrate. Another exemplary source of variation arises from a lack of uniform etch rate during etching of the columns which comprise the LPs, with a higher etch rate leading to slightly narrower columns, due to the slight isotropy of all etching processes, which are used to define the on-chip mLP features. This lack of uniformity can be promoted by cleaving the wafer being processed into smaller chips to enhance edge non-uniformities during dry etching. Yet another source of variation arises during the formation of the pedestal joining adjacent cavities, which typically involves a wet etching step that is susceptible to non-uniformities in etching rate, which in turn depend on spatial variations in temperature, etchant concentration and surface wettability. Slight differences in pedestal radius alters the optical path distance over which a lasing mode is confined leading to small albeit measurable differences in emission wavelength.

In the method 100, the step of etching the first layer, the first spacer layer, and the second layer may be done in manner that produces a plurality of columnar structures having at least one non-uniform cross-sectional dimension. For instance, active tuning of the cavity radii can take place as an extra step during the fabrication process. One way in which this can be done is by introducing a wet etchant which attacks the cavities thereby changing their radii. The method 100 may include an additional step of etching the columnar structures in a manner that causes the mean cross-sectional diameter or the vertical angles of the columnar structures to be deliberately varied across the substrate. Similarly, the method 100 can include etching the columnar structures in a manner that causes the first optical cavity to have a different diameter than the second optical cavity.

Figure 14:
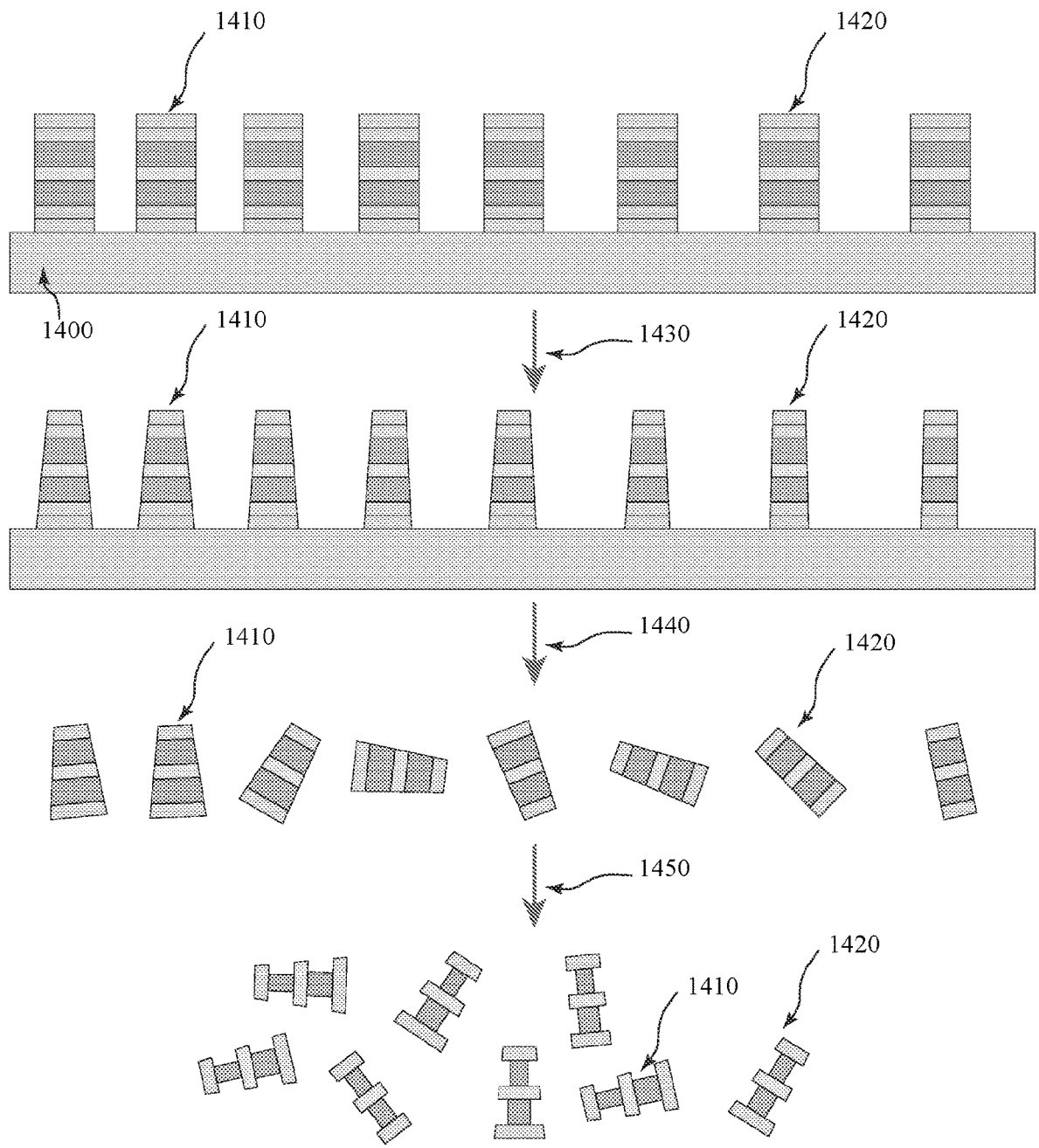
FIG. 14 is a schematic depiction of a process of etching the columnar structures to produce a plurality of multiplet microparticles with greater diversity of cavity radii.

FIG. 14 shows an exemplary embodiment of this strategy in which a wet etchant is introduced that non-selectively attacks all layers in the columns. This etchant can be introduced before or after removal of the multiplet laser particles from the original substrate. However, the process can be more controlled if the etchant is used to removal material from the columns whilst they are still attached to the substrate 1400. As shown, an already patterned wafer can be formed with three active optical cavities and spacer layers between the gain layers. In this depicted process, a lithographic mask can be used that has disk patterns with increasing inter-columnar spacing from one side to the other side (left to right in FIG. 14). After dry etching, this non-uniform pattern results in columns (e.g. 1410) in a dense array on one region and columns (e.g. 1420) in a sparse array on another region. Thus, a method step 1430 of applying an etchant in this manner can generate a spread of different cavity sizes by etching different cavities at different rates based on positional information. For example, cavities that arise from upper layers of the epitaxial growth (i.e. furthest from the substrate) can have their radii reduced the most since these are the most exposed to the etchant. By contrast, cavities that arise from layers closest to the substrate can be etched more slowly, since the etchant will have to penetrate deeper, between adjacent columns, to attack these features. Furthermore, columnar structures that form tightly packed patterns (e.g. 1410) will slow penetration of the etchant into the deeper lying cavities more effectively than sparsely spaced columns (e.g. 1420). Overall, this can lead to cavities arising from the upper epitaxial layers being smaller, on average, than cavities arising from lower layers. Cavities that arise from deeper layers can typically be larger, due to limited etchant penetration between adjacent columns. Furthermore, deep lying cavities that originate from columns that are part of densely packed regions can be larger than those from sparse regions. As a result, the cavities arising from the upper epitaxial layers in each case can be the same size since there are no differences in etchant penetration for the uppermost layers. However, the cavities arising from the lower layers can be smaller for those cavities that arise from the sparse array when compared to the cavities that arise from the dense array. Consequently, by carefully arranging the interspacing between the columnar structures, diversity in the size of the formed optical cavities can be controlled.

For even more control, a sequence of digital etches can be performed that remove material from the defined columns on the nano- and subnanometer scale, thereby leading to slight decreases in resultant cavity radii. In one exemplary process, an oxidizing agent, such as hydrogen peroxide, can be used to first oxidize the outer surface of the columns. The ability of this aqueous oxide to contact the material at different locations across the wafer determines the amount of material oxidized at different locations. The most exposed surfaces may be preferentially oxidized. Therefore, cavities arising from near the top of the column can form a thicker surface oxide than cavities arising from deeper in the columns, closer to the substrate. Furthermore, the spacing between columns can affect the ability of the oxidizer to penetrate to the deeper regions of the columns. This can result in preferential oxidation of columns that are spatially exposed, with reduced oxidation of columns that form tightly packed arrays. In a second step of the digital etch, the oxidized material can be removed by a selective oxide etchant. For instance, sulfuric acid can be used in the case of InGaAs. For instance, the method 100 may include a further step of etching the columnar structures by applying a digital etch cycle of sequential steps of $H_2O_2$ immersion and $H_2SO_4$ immersion or $O_2$ plasma and $H_2SO_4$ immersion. Thus, a strategy is provided for using a digital etch to randomize laser-cavity diameters. Cavities that are more physically exposed on the wafer can have their radii altered by a different amount to those that are more sheltered. Therefore, the cavities arising from the upper layers of the wafer can have their radius decreased more than those arising from lower layers. Thus, the process outlined in FIG. 14 can produce a set of multiplet laser particles of different combinations of cavities sizes. Each laser particle in this set can produce distinctive spectral peaks. This can allow the set of laser particles to produce a number of ID, $N_{ID}$, close to the theoretical limit described in Equation 1 below.

For even more control, photoelectrochemical etching can be applied to the wafer following the formation of the columnar structures having of a capping layer, spacer layers, and multiple different gain materials. For instance, a light source can be used to illuminate the wafer. Absorbed light can generate electron-hole pairs which can promote etching by a surrounding liquid electrolyte. The quantity of these carriers may be dependent on several factors such as the penetration of the light to the semiconductor layer, absorption of the light by the layer, and strength of the light. Therefore, a spatially varying intensity of this incident light can be used to modulate the carrier density. In regions of low intensity, etching will be slow, while in regions of high intensity it will be faster. Regions with intermediate levels of incident light will be etched at an intermediate rate. Without being bound by theory, this mechanism relies on the production of charge carriers within the semiconductor material generated by interband light absorption to speed up etching. Therefore, by changing the wavelength of the incident light, particular gain layers can be targeted. For example, if one gain material has a smaller energy bandgap than the other materials, it can be selectively targeted by light having photons with larger energy than this material bandgap but smaller in energy than the bandgaps of the other materials in step. Such light will be absorbed only by the gain material with bandgap energy smaller than that of the energy of the incident photons. Therefore, the diameter of the cavities from which this gain material is forms can be selectively targeted for photochemical etching. Further wavelengths of light can be used to selectively tune the diameters of the cavities produced from other gain layers. For example, incident light comprising of photons of energy greater than the bandgap energy of the gain layers will result in faster etching of these cavities compared to the etching rate of other gain layers. This technique can therefore be used to introduce variation between the cavity sizes in the resultant microparticles after they have been removed from the substrate.

The method 100 may include a further method step of applying a coating to at least a portion of the columnar structures. The coating may be applied in a manner that allows the columnar structures to be wet etched without substantially corroding the first optical cavity, the first spacer region, and the second optical cavity. The coating may be a polymer. For instance, the coating may be $SiO_2$.

Figure 17:
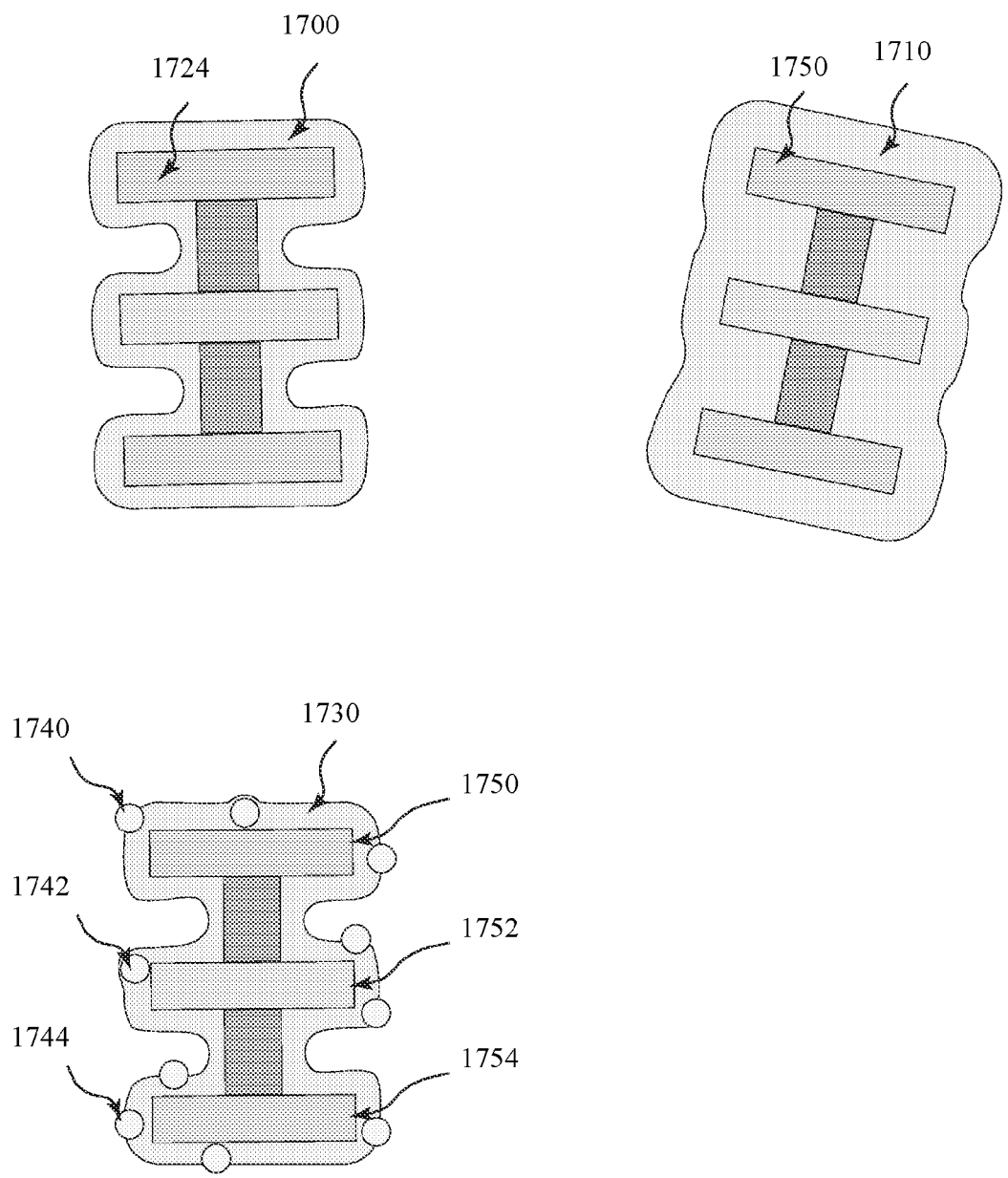
FIG. 17 is a schematic depiction of a photonic microparticle having three microdisk lasers joined by two spacer regions and surrounded by a chemical coating.
Figure 18:
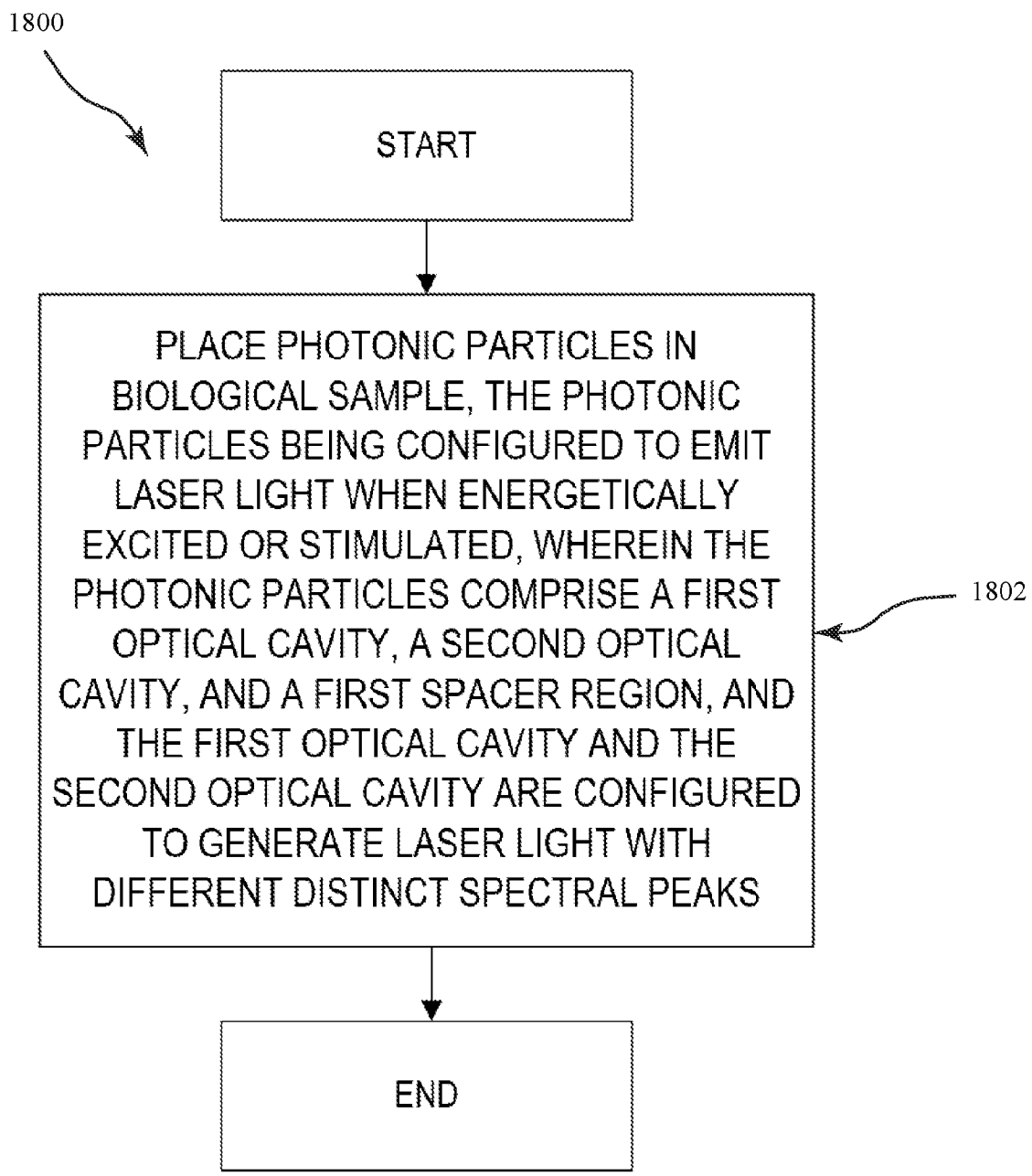
FIG. 18 is a flowchart for a method of emitting laser light within a biological sample, in accordance with one aspect of the present disclosure.

FIG. 17 depicts exemplary multiplet laser particles resulting from applying additional coating method steps to the formation processes described herein. Through such a coating process, a shift in the emission wavelength can also be introduced by adding a coating layer 1700 to the outside of the laser particle 1724. For example, a Stöber process can be used to form a thin $SiO_2$ shell around the particles after they have been released from the growth substrate. The coating material can encapsulate both the active gain materials and spacer materials. One benefit of such coating is that the coating separates the microparticles from the environment and protects them from optical, physical, and chemical perturbations from the environment. A thicker coating 1710 with a thickness greater than 150 nm may be desirable in order to maximize mechanical robustness, chemical protection, and optical isolation from the environment. However, thinner coating may be used especially in non-corrosive environment, such as the air or resin. For biological applications, the coating materials may be robust inorganic materials with low degradability in the aqueous environment. The coated microparticles may be further coated with functional, organic or biological materials, such as proteins and oligonucleotides, for applications such as cellular targeting and RNA captures. The coating 1730 may allow the nanoparticles to be more firmly attached to the microparticles.

Besides the protective role, the coating process may facilitate attaching light-scattering nanoparticles on the surface of laser microparticles. For instance, a silica coating 1730 can be applied after the nanoparticles (1740, 1742, 1744) are chemically attached to the surface of microparticles. The nanoparticles may have advantageous material properties. For instance, the nanoparticles can have diameters ranging from 10 to 100 nm, may be made of gold, semiconductor, or high-index material, and/or can scatter the output laser emission from individual laser cavities to alter the radiation pattern. For instance, the three nanoparticles (1740, 1742, 1744) can predominantly scatter output light from the three microdisk lasers (1750, 1752, 1754), respectively. Otherwise the radiation intensity may be stronger along the plane of the cylindrical symmetry, but the light scattering can divert some of the radiation to the direction normal to the plane.

Without being bound by theory, the chemical coating can lack complete uniformity, resulting in marginally different growth rates on different laser particles. Specifically, some multiplet laser particles can form slightly thicker coatings than others. The coating layer may have a refractive index typically different from the active cavity and gain materials and also from the surrounding medium in which the laser particle is intended to be used. As a result, the coating layer can increase the effective refractive index directly surrounding the cavity, which typically shifts the lasing mode emission to longer wavelengths. Furthermore, this process can produce pure $SiO_2$ nanoparticles particularly at higher reaction temperatures (~70° C.), which can adhere and be incorporated into the coating. The random nature of this process can generate variations in the refractive index of the material with which the lasing mode interacts causing permanent shifts in the particle's emission wavelength compared to the bare particle.

This type of coating induced wavelength change can also be generated whilst the laser particle is attached to the substrate. The substrate used can either be the original growth substrate or some other material, onto which the multiplet laser particles were deposited via liquid suspension. The coating can be generated from a source of one or more coating precursors that generates a flux of material onto the laser particles by, for example, evaporation or sputter deposition. The process can be rendered even more non-uniform by angled mounting of the substrate exposed to the source. As the material spreads away from the source, the flux of the depositing material at locations far from this source decreases compared to regions closer to the source. Therefore, the thickness of the coating formed on laser particles far from the source can be smaller than that formed on particles close to the source. Generally speaking, the wavelength shift induced in laser particles far from the source will therefore be greater than those close to the source. To remove unwanted deposition that prevents release of the multiplet laser particles from the substrate in subsequent processing, vertical bombardment of species generated from an anisotropic ion etching process can be used, effectively trimming exposed regions of the deposited coating. In such a method step is applied, the final product can be multiplets coated with thin films of differing thicknesses depending on their spatial location on the substrate relative to the source along with stochastic (shot noise-like) variations in coating thickness.

In one aspect, the present disclosure provides a microparticle formed of a columnar structure having a first optical cavity situated about a first gain medium, a second optical cavity situated about a second gain medium, and a first spacer region contacting the first gain medium and the second gain medium, wherein the first optical cavity and the second optical cavity are each capable of generating laser light with a distinct spectral peak when energetically excited.

Figure 15:
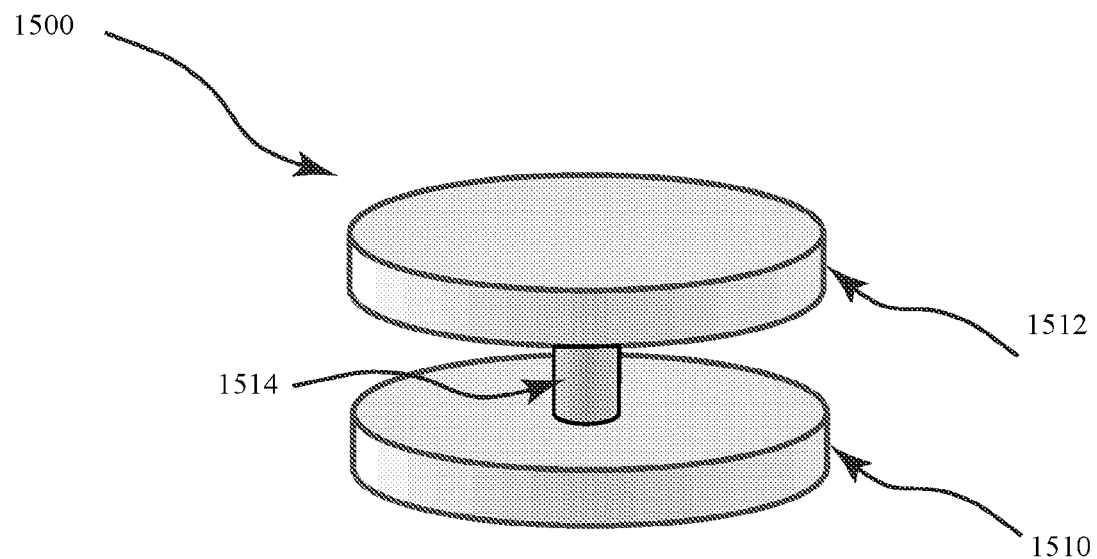
FIG. 15 is a schematic depiction of a photonic microparticle having two microdisk lasers joined by a spacer region.

FIG. 15 depicts an exemplary photonic microparticle 1500 consistent with the methods described herein. The microparticle 1500 is formed of a columnar structure having a first optical cavity 1510 situated about a first gain medium, a second optical cavity 1512 situated about a second gain medium, and a first spacer region 1514 contacting the first gain medium and the second gain medium. The first optical cavity 1510 and the second optical cavity 1512 are each capable of generating laser light with a distinct spectral peak when energetically excited.

As shown, the first spacer region 1514 may have a smaller cross-sectional area than the cross-sectional area of the first optical cavity and the second optical cavity. Specifically, the diameter of the first spacer region 1514 may be smaller than those of the optical cavities by more than twice the longest optical wavelength of the emission spectral peaks in the optical cavities. The length of the first spacer region between the first gain medium and the second gain medium may be at least 50 nm, 100 nm, 150 nm, 200 nm, 300 nm, or 500 nm.

In the general case of a singlet optical disk laser particle, the cavity of the microparticle achieves resonance by confining light within its interior based on a refractive index difference with the surrounding environment. Since the optical mode predominantly overlaps with the periphery of the disk, this region must be bounded by a lower index material in order to properly confine any light generated by stimulated emission. During operation of a singlet laser particle in liquid, this requirement is easy to satisfy: many liquids have a refractive index of <1.4 (1.33 for water) whereas a semiconductor cavity will, depending on the material and resonance wavelength, have a refractive index that is far higher (e.g. >3.5 for InGaAs at 1064 nm). Therefore, confinement of light within the cavity will arise naturally from total internal reflection. Similarly, for the constituent cavities comprising a multiplet laser particle, regions of the cavity with high optical mode density must be separated by a lower index material (usually just the surrounding medium) to prevent loss of radiation from the resonating mode. Therefore, the pedestal joining the adjacent cavities, which itself will typically be a high refractive index semiconductor, must be sufficiently small to not cause excessive mode leakage that would preclude lasing whilst also being sufficiently large to provide adequate mechanical support.

The first spacer region 1514 may comprise a composition that allows the first spacer region to be selectively etched with respect to the first gain medium and the second gain medium. Selectively etching the first spacer region 1514 can allow the region to have a reduced volume that does not adversely affect the optical cavity lasing properties. The first spacer region 1514 may comprise an epitaxially grown semiconductor material. For instance, the first spacer region 1514 may be formed from an epitaxially grown layer originally positioned between a layer of the first gain medium and a layer of the second gain medium.

The columnar structure that forms the microparticle 1500 may be attached to and extending from a substrate layer. The sidewall angle of the columnar structure relative to the substrate layer may be between 60° and 120°, or more specifically between 70° and 110°. The mean diameter of the optical cavities on the columnar structure may be more than 0.5 µm, less than 3 µm, or between 0.5 µm and 3 µm. The axial length of the columnar structure may be less than 10 µm, less than 5 µm, or less than 3 µm. The size of the microparticles may range from 0.5 to 5 µm in all three dimensions, but the axial length may be larger than 10 µm as the number of optical cavities stacked is increased.

The first optical cavity 1510 and the second optical cavity 1512 may be positioned concentrically. The spacer region may also be positioned concentrically. The first optical cavity and the second optical cavity may be semiconductor microdisks. For instance, the first optical cavity and the second optical cavity may be microdisks with diameters greater than 0.5 µm, less than 3 µm, or between 0.5 µm and 3 µm. The axial lengths of the first optical cavity 1510 and the second optical cavity 1512 may be greater than 100 nm, less than 550 nm, or between 100 nm and 550 nm in thickness.

The first optical cavity 1510 may be configured to generate a different spectral peak than the second optical cavity 1512. For instance, the first gain medium and the second gain medium have different specific gain spectrums that result in different spectral peaks. Similarly, the first optical cavity 1510 and the second optical cavity 1512 may have at least one substantially different dimension. Conversely, the first optical cavity 1510 may generate about the same spectral peak as the second optical cavity 1512. The generated distinct spectral peaks may have linewidths of less than 5 nm, less than 3 nm, less than 1 nm, or less than 0.5 nm. The wavelength of each distinct spectral peak may be more than 0.4 µm, less than 1.9 µm, or between 0.4 µm and 1.9 µm.

The first gain medium and the second gain medium may each comprise, consist essentially of, or consist of a semiconductor material. The active semiconductor material of the first gain medium and the second gain medium may each comprise, consist essentially of, or consist of an element selected from including In, Ga, As, P, and combinations thereof. For instance, the first gain medium and the second gain medium may both comprise InGaAsP. The first spacer region may comprise indium phosphide. The first optical cavity and the second optical cavity may further comprise organic or biological materials. The first optical cavity and the second optical cavity may both have a refractive index greater than 1.5, greater than 2, greater than 2.5, greater than 3, or greater than 3.5.

The microparticle may be configured to be placed in a biological sample for emission of coherent light inside the biological sample when the particle is energetically excited. The microparticle may be configured to be inserted into a living organism for emission of laser light inside the organism when the particle is optically excited using a pump light source. The microparticle may be configured to emit light comprising a spectrum having two narrowband peaks defined by cavity modes of the first optical cavity and the second optical cavity.

Figure 16:
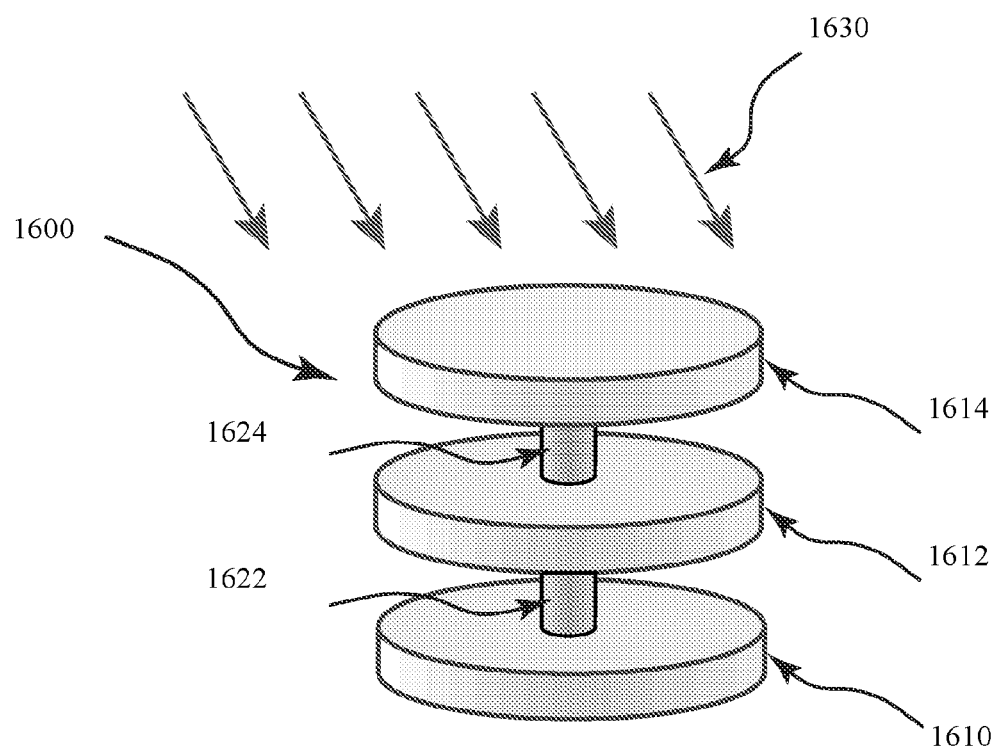
FIG. 16 is a schematic depiction of a photonic microparticle having three microdisk lasers joined by two spacer regions and the laser emission spectrum of the microparticle.
Figure 16:
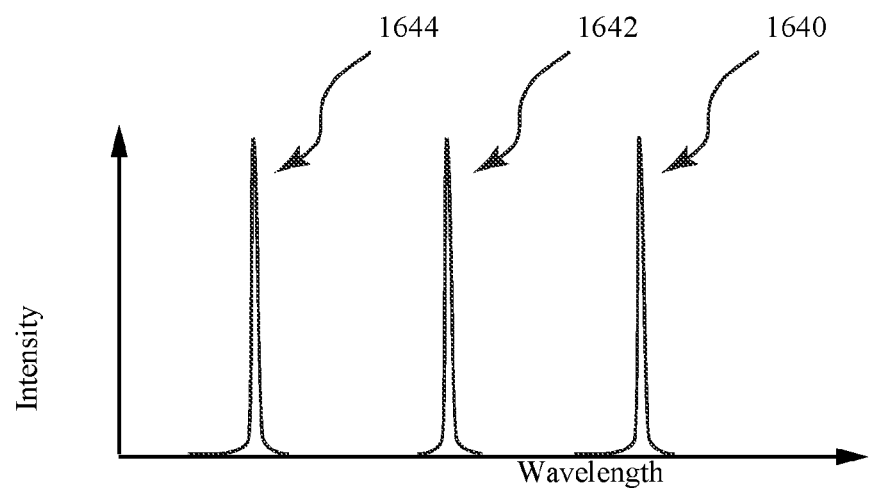

As shown in FIG. 16, the microparticle can include additional optical cavities and spacer regions. In addition to a first optical cavity 1610, first spacer region 1622, and second optical cavity 1612, the exemplary microparticle 1600 includes a third optical cavity situated about a third gain medium; and a second spacer region positioned between the second gain medium and the third gain medium. The spacer regions, also called pedestals, join the multiple optical cavities, which are depicted in the form of microdisks. The pedestals can optically separate the microdisks, so that the cavity modes from each microdisk are not influenced by the cavity modes in other microdisks. To generate laser emission from the microparticles, excitation energy may be needed. This pumping can be achieved using excitation light 1630 with an appropriate wavelength, intensity, pulse duration and pulse energy. Typically, nanosecond laser pulses can be used for optical pumping. However, other means, such as continuous wave pump light or current injection, may also be possible depending on the requirements of specific multiplet laser particles. For the depicted microparticle having three cavities, the output emission signature can be described by the emission wavelengths of at least three peaks $\lambda_{peak1}$, $\lambda_{peak2}$ and $\lambda_{peak3}$ (1640, 1642, and 1644).

While the microparticle 1600 has three optical cavities in this depiction, microparticles having at least 4, 5, 6, 7, 8, 9, or 10, or more optical cavities are possible. Each of the microdisks in a microparticle may be designed to support single-mode lasing. This can be achieved by having sufficiently small diameter and thickness.

As noted above, to reduce optical coupling between optical cavities, the diameters of the pedestal spacers may be smaller than those of the microdisks so that lasing modes circulating in the microdisks have small fraction of their energy in the spacers. For the same reason, the lengths of the pedestal spacers may be sufficiently large so that a lasing mode in one microdisk have substantially small fraction of its energy in a neighboring microdisk. The longer the pedestals are, the less optical coupling is expected between disk lasers. However, the length of the spacer should not be too large to compromise mechanical strength. Typically, the length of the spacer may be between 100 and 550 nm depending on the design of microdisks. Consequently, a properly sized spacer region provides a distinct advantage over any attempt to simply combine two separately-formed laser particles. Attempting to simply combine two distinct microparticles can unfavorably result in increased optical coupling, asymmetry, and particle instability.

Without being bound by theory, when there is finite optical coupling between cavities, the spectral emission peaks of multiplet microparticles may not be necessarily identical to the spectral emission peaks of individual cavities when they are completely separated. The emission peaks between two coupled cavities may be pulled toward each other or repelled from each other depending on coupled modes and coupling strength. Both weak and strong coupling regimes may be achieved depending on the length of the spacer regions and the degree of optical overlap between cavity modes of adjacent lasers in multiplet microparticles.

In the simplest non-coupled or weakly coupled cases, the number of identifiable particles becomes massively scalable. To a simple approximation, in which each multiplet includes constituent LPs that lase independently, the number $N_{ID}$ of uniquely identifiable (ID) particles goes as:

$$N_{ID} = \frac{n!}{m!(n-m)!} \quad (1)$$

where n is the number of spectrally distinguishable singlet emitters, and m is the number of independent optical cavity emitters of which the multiplet laser particle is comprised. For example, for n=400 and m=3, we find $N_{ID}$ to be ~10.6 million. With n=400 and m=7, $N_{ID}$ is increased to 300 trillion. Consequently, the multiplet laser particles of the present disclosure allow for a drastic expansion in the tagging capabilities of prior laser particle constructions.

FIG. 17 depicts exemplary microparticles which further comprises a coating encapsulating at least the first optical cavity, the first spacer region, and the second optical cavity. The coating may comprise, consist essentially of, or consist of an inorganic material. The coating may comprise nanoparticles.

In another aspect, the present disclosure provides an aqueous solution comprising a set of suspended multiplet microparticles.

In one aspect, the present disclosure provides system for producing photonic microparticles configured to emit light when energetically excited. The system can include the semiconductor wafer described in the techniques previously described herein. For instance, the semiconductor wafer can comprise a substrate layer, a first layer positioned above the substrate layer and formed of a first gain medium including one or more epitaxially grown inorganic materials, a second layer positioned above the first layer and formed of a second gain medium including one or more epitaxially grown inorganic materials, and a first spacer layer positioned between the first layer and the second layer.

In the system, the first spacer layer may be formed of a material having a higher reactivity to at least one chemical etchant than both the first gain medium and second gain medium, thereby allowing the first spacer layer to be selectively wet etched. The semiconductor wafer may further comprise a third layer positioned above the second layer and formed of a third gain medium including one or more epitaxially grown inorganic materials, a second spacer layer positioned between the second layer and the third layer, a fourth layer positioned above the third layer and formed of a fourth gain medium including one or more epitaxially grown inorganic materials, and a third spacer layer positioned between the third layer and the fourth layer. At least one of the first spacer layer, the second spacer layer, or the third spacer layer may be formed of a material having a higher reactivity to at least one chemical etchant than the other spacer layers, thereby allowing at least one of the first spacer layer, the second spacer layer, or the third spacer layer to be selectively wet etched. The first gain medium and the second gain medium may both comprise InGaAsP and the first spacer layer may comprise InP.

The system may further include an etching subsystem configured perform the method steps described herein. For instance, the system may include a containment system and a wet etchant source configured to form the columnar structures or to remove or corrode the spacer regions to produce the laser particles.

In another aspect, the present disclosure provides a method 1800 of emitting laser light within a biological sample. The method includes a first step 1802 of placing one or more photonic particles in the biological sample, the photonic particles being configured to emit laser light when energetically excited or stimulated, one or more of the photonic particles comprising a first optical cavity situated about a first gain medium, a second optical cavity situated about a second gain medium, and a first spacer region contacting both the first gain medium and the second gain medium, wherein the first optical cavity and second optical cavity are each configured to generate laser light with a distinct spectral peak when energetically excited, and the spectral peak generated by the first optical cavity is different than the spectral peak generated by the second optical cavity.

The method 1800 may further include a step of optically exciting or stimulating the photonic particles using a light source. For instance, the method 1800 may further comprise using a pump light source to emit an excitation light at photonic particles from outside the biological sample to excite the photonic particles to emit the laser light. The biological sample may be a living organism. The biological sample may be a tissue of a subject being treated. The spectral width of each peak may be narrower than 1 nm.

In another aspect, the present disclosure provides a microscopy system comprising a pump light source, a beam scanner, a spectrometer including a resolution of less than 5 nanometers and an acquisition rate of more than 1 kilohertz, a spectral analyzer configured to distinguish spectral peaks of laser output from broadband background due to fluorescence, and a sample that contains one or more photonic laser microparticles, wherein each microparticle is configured to generate laser light with multiple distinct spectral peaks when energetically excited. In general, the microscopy system can be used to identify the multiplet laser particles described herein. The microscopy system may further include a computer arrangement configured to generate one or more images of a sample based on emission spectra from photonic laser particles contained in the sample.

EXAMPLES

The following Examples are provided in order to demonstrate and further illustrate certain embodiments and aspects of the present disclosure and are not to be construed as limiting the scope of the disclosure.

Example 1

Figure 19:
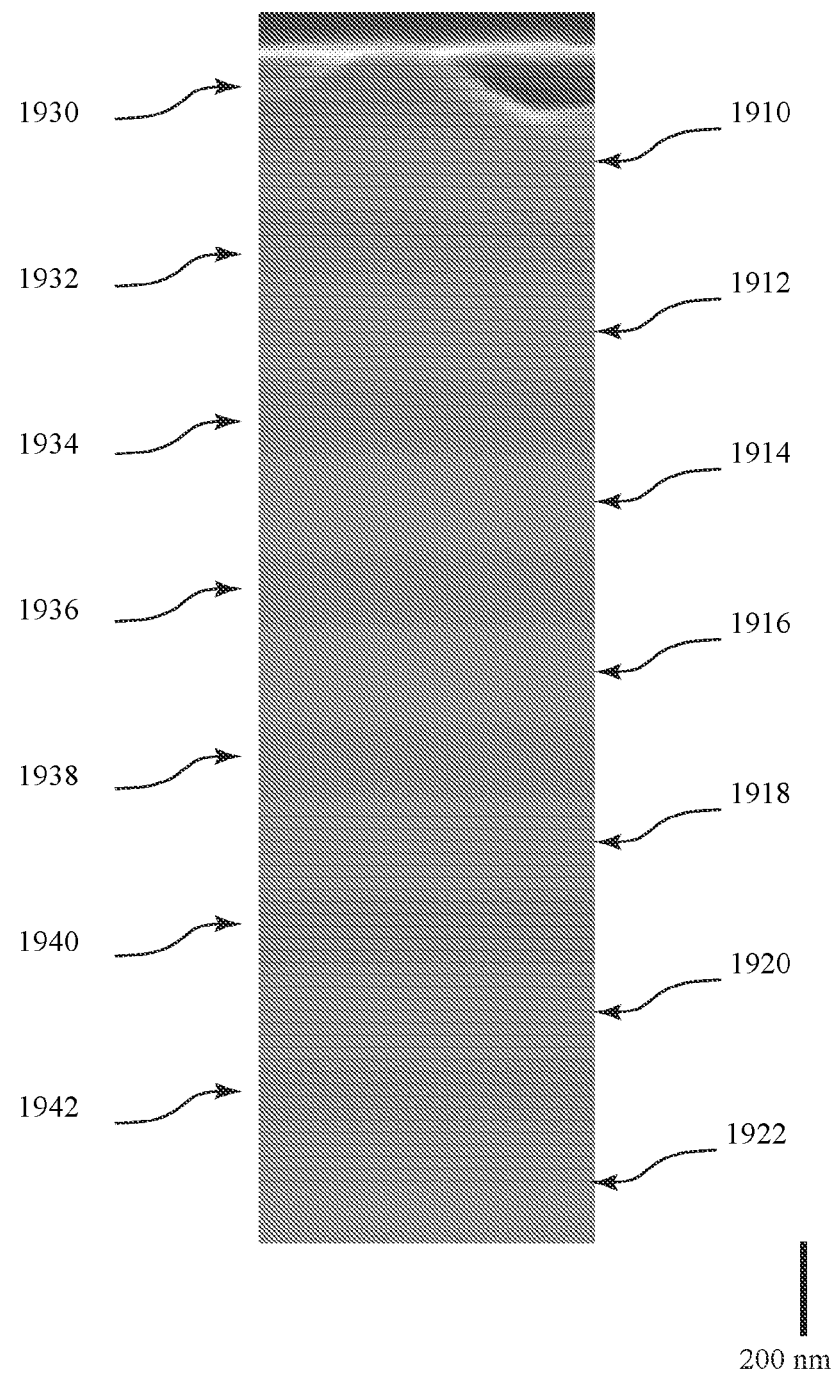
FIG. 19 is a scanning electron microscopy image of the epitaxial layers of a wafer used in the experiment of Example 1.

Proof-of-concept experiments were performed to produce singlet laser particles from a multilayered wafer. In the first experiment, a quaternary semiconductor wafer having nine InGaAsP gain layers and ten InP sacrificial layers was grown on an InP substrate. FIG. 19 shows a scanning electron microscopy (SEM) image of a cross-section of the wafer, showing seven gain layers (1910-1922) with a thickness of about 200 nm and seven sacrificial layers (1930-1942) with a thickness of about 150 nm.

Figure 20:
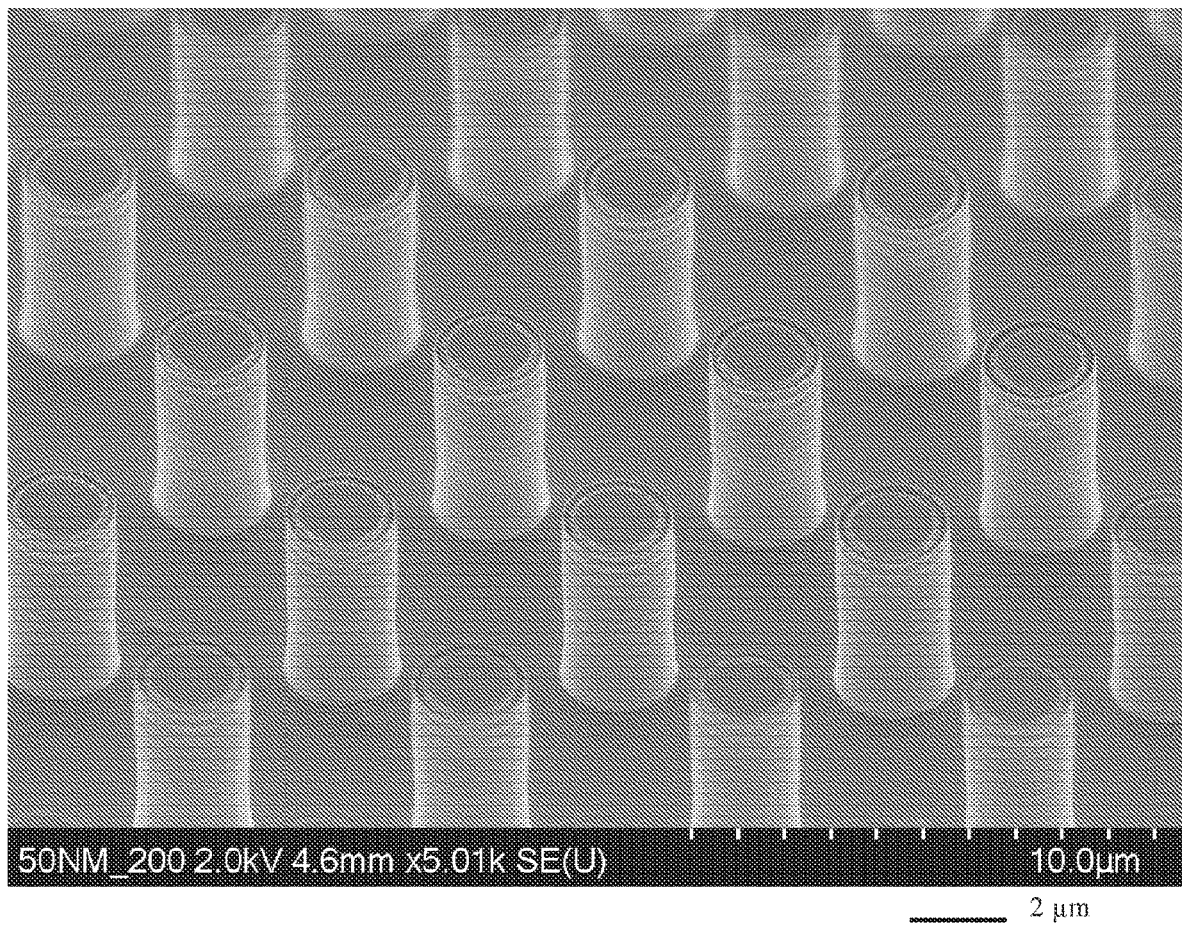
FIG. 20 is a scanning electron microscopy image showing an array of multi-layer columnar structures formed in the experiment of Example 1. Each columnar structure is capable of producing multiple microdisk laser particles or multiplet laser particles.

FIG. 20 shows an SEM image of an identical wafer after undergoing experimental involving of lithography and reactive-ion etching (RIE) etching. An array of columnar structures with a diameter of about 2 µm and a height of about 3.5 µm were produced.

Figure 21:
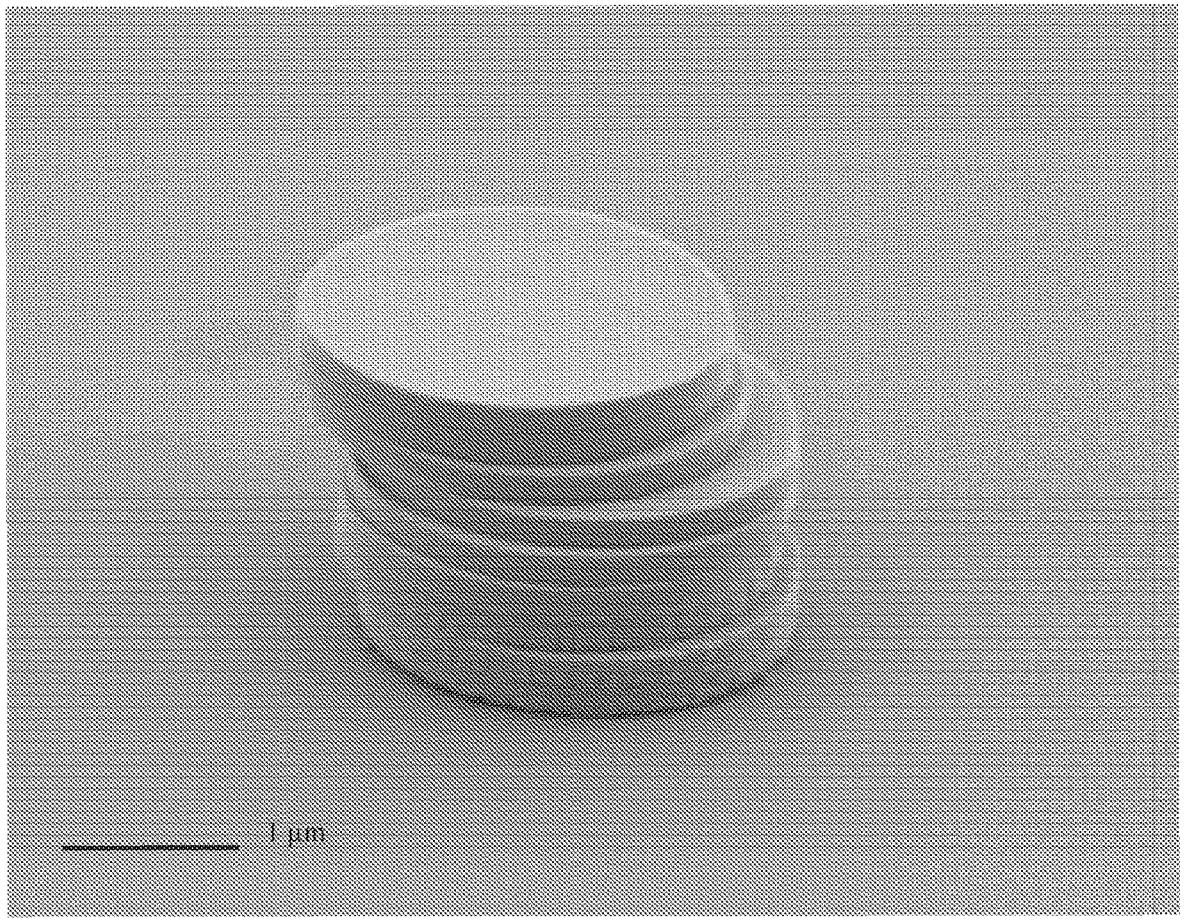
FIG. 21 is a scanning electron microscopy image of 9 microdisk lasers stacked on top of each other after being released from a columnar structure in the experiment of Example 1.

FIG. 21 shows an SEM image of nine experimentally produced microdisk lasers stacked on top of each other after being released from a columnar structure by diluted HCl wet etching but not fully separated from each other. For a sacrificial layer of thickness 150 nm, corroding the sacrificial InP layer, even with undiluted HCl, can fail to repeatedly separate individual LPs, which instead agglomerate into stacks. While each microdisk is capable of emitting fluorescence, the interactions of bare disks with each other enhances optical loss and hinders lasing. In order to address this aggregation problem, we prepared another wafer in which the InP sacrificial layers have a thickness of 300 nm. The experimental findings showed that disks produced from this wafer did not agglomerate during the wet etching process for HCl dilutions as low as 3:1 HCl:H$_2$O.

Figure 22:
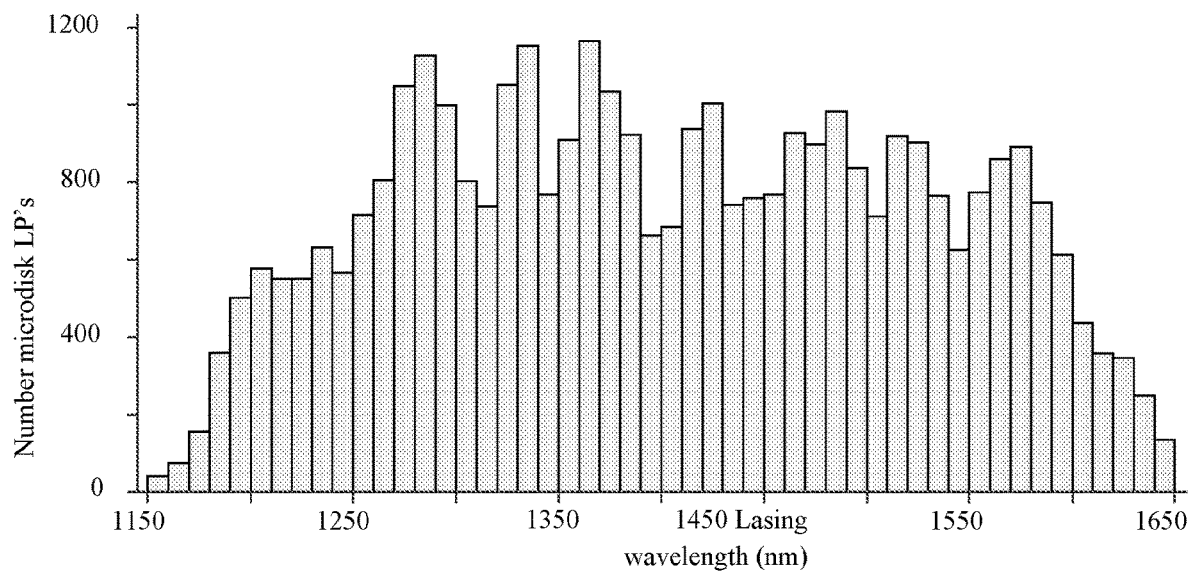
FIG. 22 is a histogram of lasing wavelength from over 10,000 microdisk laser particles produced in the experiment of Example 1.

Another wafer was also prepared, which had 9 epitaxial layers of InGaAsP interspersed with nine 300 nm-thick layers of InP. The InGaAsP composition of each gain layer was varied such that its bandgap wavelengths was shifted by 50 nm. The bottom InGaAsP layer has a photoluminescence peak at 1190 nm, the next at 1240 nm, and so on, until the top InGaAsP layer has a fluorescence emission peak at 1590 nm. Laser particles were then generated by etching with 3:1 HCl:H$_2$O, releasing them into solution. FIG. 22 depicts the histogram of lasing wavelength from over 10,000 resulting microdisk laser particles placed in a gel. The peak lasing wavelengths span a range from 1150 nm to 1650 nm. This wide distribution indeed confirms that laser particles were produced from every gain layer of the epitaxial wafer.

Example 2

Figure 23:
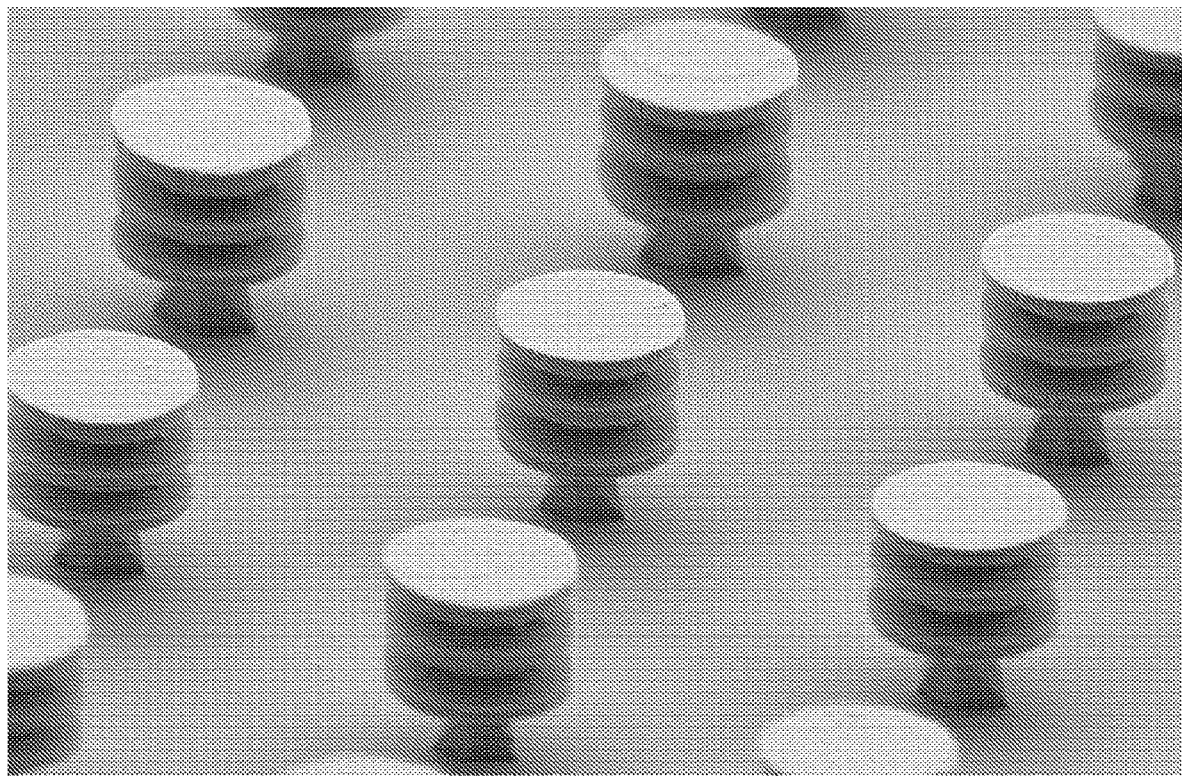
FIG. 23 is a scanning electron microscopy image of fabricated multiplet particles before detaching from their wafer in the experiment of Example 2.

Proof-of-concept experiments were performed to produce multiplet laser particles from a multilayered wafer. The experiment used an epitaxial wafer that had three InGaAsP gain layers, two InP spacer layers between the gain layers, and InP sacrificial layers grown on an 3-inch-diameter InP substrate. Then using photolithography and RIE, cylindrical columnar patterns were produced. Following this step, the substrate was placed in an aqueous etchant (HCl) to selectively and partially etch InP. This resulted in on-substrate multiplets. FIG. 23 shows the electron microscopy image of the processed wafer. In each multiplet, three laser microdisks connected by InP spacer pedestals (not visible in the image) are clearly shown. Each device is mounted on a InP pillar (830) produced by the partial wet etching.

Figure 24:
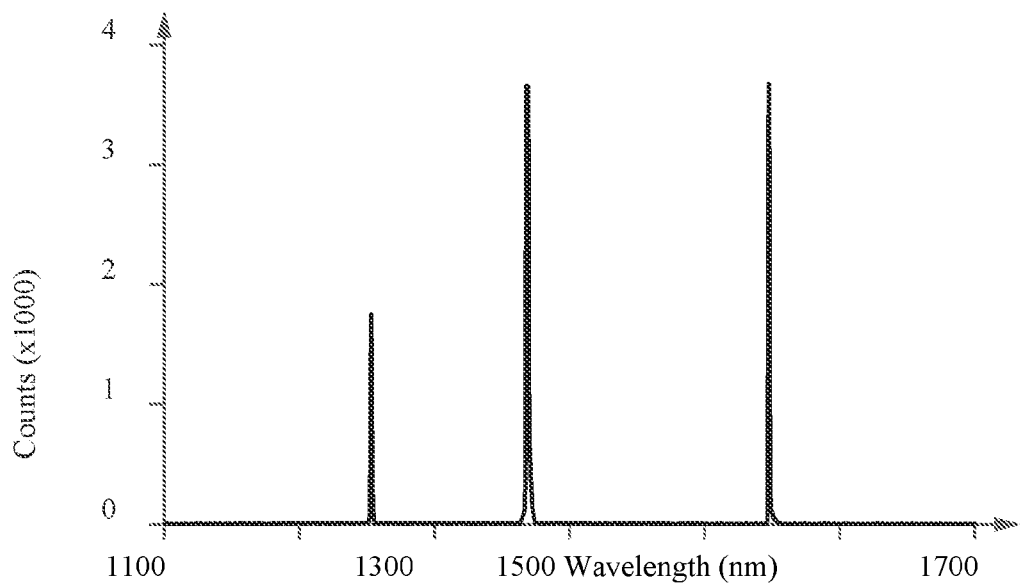
FIG. 24 is a graph of an output emission spectrum from an on-chip multiplet particle in the experiment of Example 2.
Figure 25:
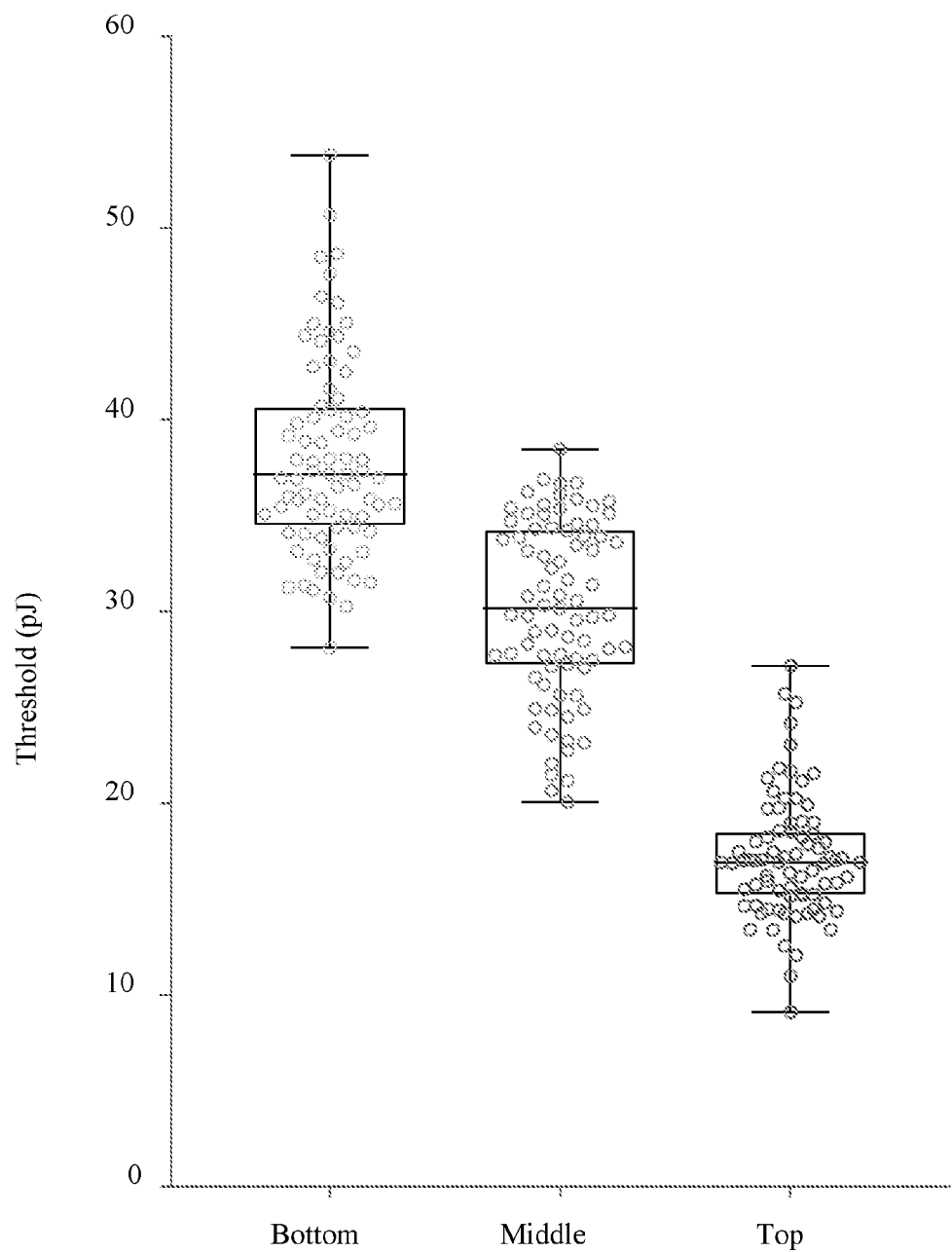
FIG. 25 is a graph of measured lasing threshold energies of top, middle, and bottom disk laser microparticles in a large number of on-chip multiplet particles in the experiment of Example 2.

A focused, pulsed 1064-nm laser beam was then used to excite each on-chip sample, and the output emission from the sample was collected and analyzed using a spectrometer. FIG. 24 shows a measured typical spectrum from a single multiplet sample. There are three distinct peaks, each corresponding to single mode emission from each disk. FIG. 25 shows the results of measuring the pump energies (thresholds) needed to achieve lasing from each disk. Just ~55 pJ pulse energies were sufficient to achieve lasing in all measured disks. Lasing in the disks at the bottom of the multiplet stacks generally required slightly more energy than the disks at the middle and top, likely due to absorption of the incident pump light by the intervening disks. However, even the highest threshold corresponded to a total incident power of ~110 µW in the microscope setup, well-below the power to cause tissue damage in a typical biological experiment.

Following, on-chip measurements, the multiplets were removed by ultrasonic agitation, which selectively broke the pedestals between the bottom disk and the substrate, likely due to the added mechanical shear stress at this location.

Figure 26:
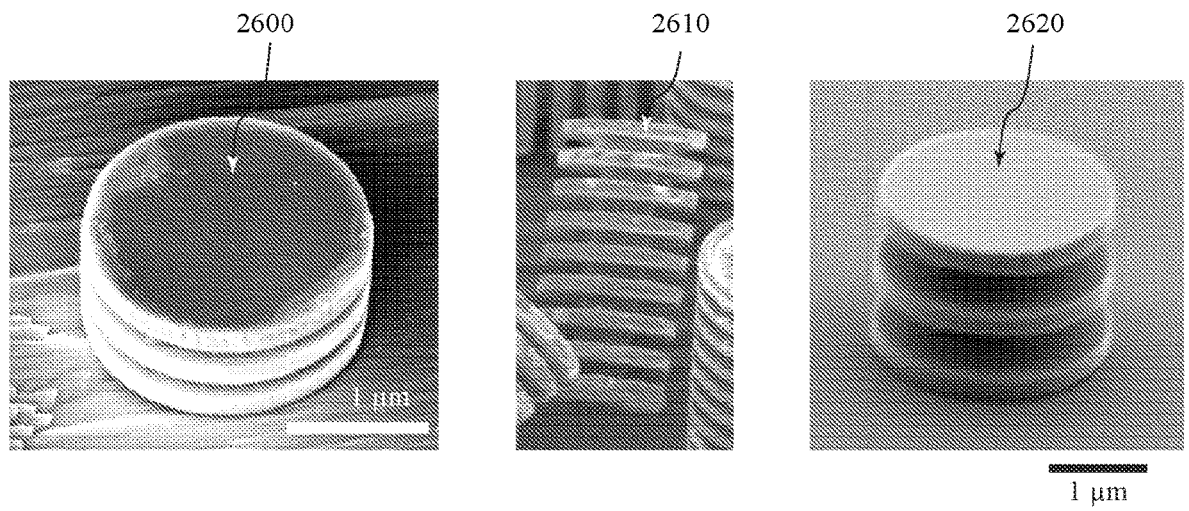
FIG. 26 is a collection of scanning electron microscopy images of fabricated multiplet particles obtained from different wafers in the experiment of Example 2.

FIG. 26 shows electron microscopy images of various microparticles produced from different wafers. Three examples are shown: a 3-disk microparticle 2600 with spacing between cavities of 150 nm, a 9-disk microparticle 2610 with a spacing of 300 nm, and 3-disk microparticle 2620 with spacing between cavities of 400 nm.

Figure 27:
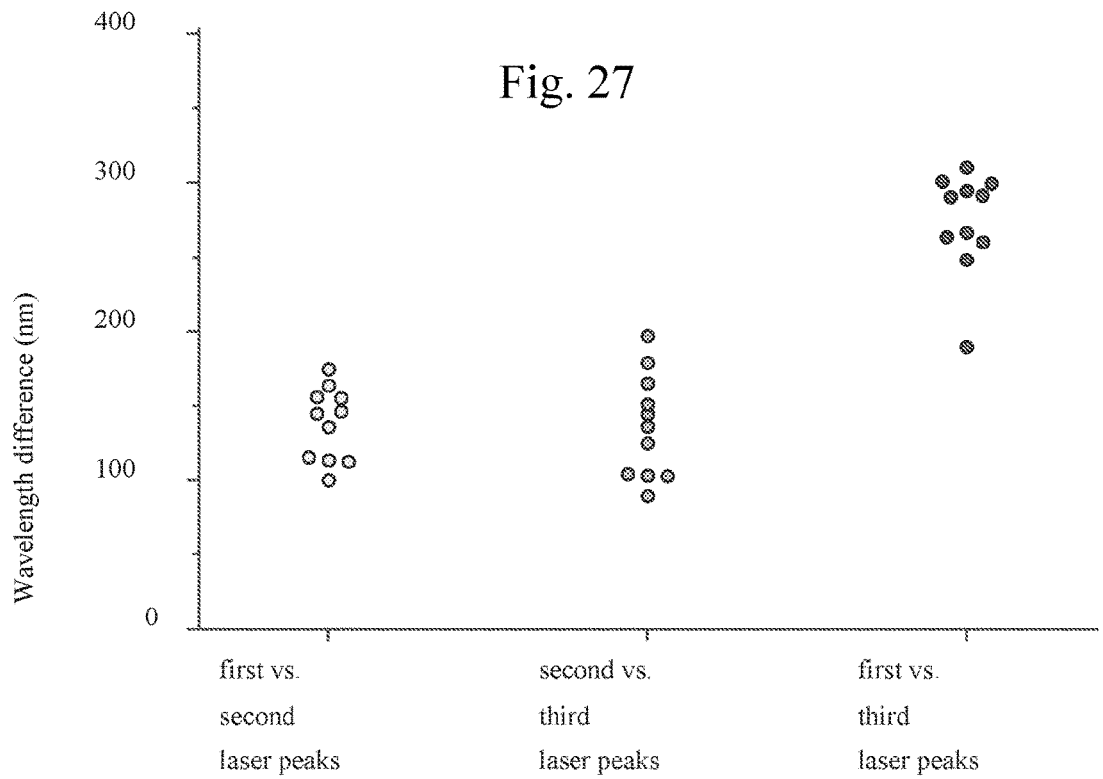
FIG. 27 is a graph of experimentally measured characteristics concerning the lasing emission wavelength of various multiplet microparticles in the experiment of Example 2.

In one experiment, the multiplet harvested from the wafer were submerged in an aqueous etchant to cause slight corrosion to each disk. This process randomized their radii, and thus their emission wavelengths. Finally, the multiplet laser particles were transferred into gel and their lasing wavelengths measured. FIG. 27 shows the recorded spectral data from eleven multiplet microparticles. Each data point (circles) in the graph corresponds to the difference in wavelength between lasing wavelength peaks from different laser disks within multiplet laser particles. The large spread of up to 100 nm suggests a lack of correlation in lasing wavelength emission between disks within the same multiplet, making them highly suitable for multiplexing applications.

Figure 28:
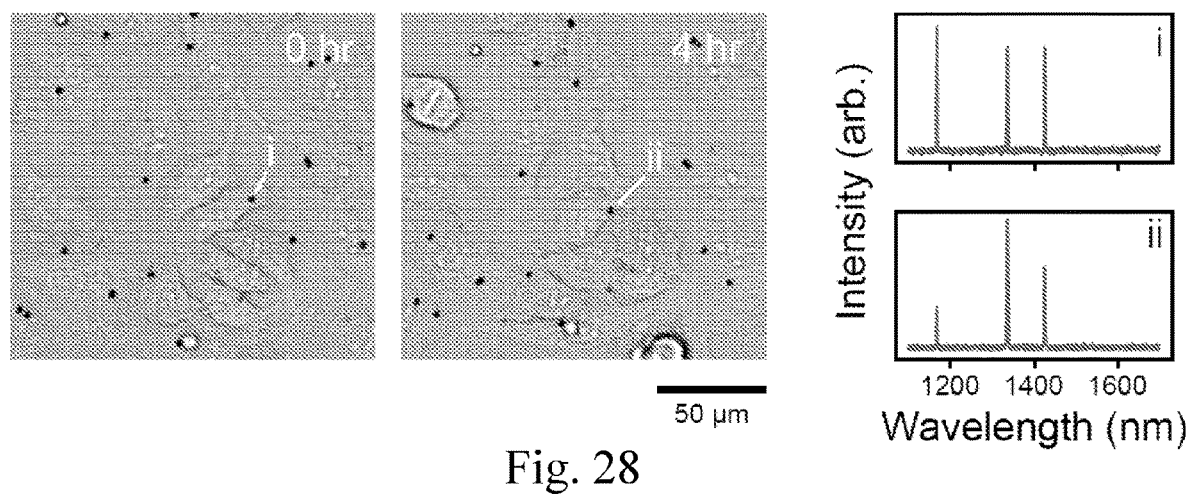
FIG. 28 is a set of correlated images and graphs showing multiplet laser particles being used in a cell-based experiment.

FIG. 28 shows multiplet laser particles being used in a cell-based experiment. Multiplets can be introduced into a population of cells (e.g., by sticking to their cell membranes or entering the cytoplasm) enabling each multiplet to act as a unique barcode particle. This allows tagged cells to be distinguished by reading the emission spectrum of the multiplets (for example by using a microscopy system). In the example shown in FIG. 28, the spectrum of multiplet 'i' taken at time 0 hr matches that of multiplet 'ii' taken at time 4 hr, enabling us to match the multiplets, and thus the tagged cells using only emission spectrum information.

The present invention has been described in terms of example embodiments, and it should be appreciated that many equivalents, alternatives, variations, additions, and modifications, aside from those expressly stated, and apart from combining the different features of the foregoing versions in varying ways, can be made and are within the scope of the invention. While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the disclosures described herein can be embodied within a form that does not provide all of the features and benefits set forth herein, as some features can be used or practiced separately from others. The scope of certain disclosures disclosed herein is indicated by the appended claims rather than by the foregoing description. All changes which come within the meaning and range of equivalency of the claims are to be embraced within their scope.

The invention claimed is:

1. A microscopy system comprising:
   a pump light source;
   a beam scanner;
   a spectrometer including:
      a resolution of less than 5 nanometers; and
      an acquisition rate of more than 1 kilohertz;
   a spectral analyzer configured to distinguish spectral peaks of laser output from broadband background due to fluorescence; and
   a sample that contains one or more photonic laser microparticles, wherein each microparticle is configured to generate laser light with multiple distinct spectral peaks when energetically excited,
   wherein each of the one or more laser microparticles comprises:
      a first optical cavity situated about a first gain medium,
      a second optical cavity situated about a second gain medium, and
      a first spacer region contacting the first gain medium and the second gain medium,
      wherein the first optical cavity and the second optical cavity each generate the laser light with the multiple distinct spectral peaks when energetically excited,
      wherein the first gain medium, the first spacer region, and the second gain medium are epitaxially grown layers, and
      wherein the first spacer region comprises an epitaxially grown semiconductor material that has a composition that allows the first spacer region to be selectively etched with respect to the first gain medium and the second gain medium without substantially affecting a volume or form of the first and second optical cavities.

2. The microscopy system of claim 1 wherein the one or more photonic laser microparticles each comprise:
   a substrate layer,
   a first layer positioned above the substrate layer and formed of the first gain medium comprising one or more inorganic materials;
   a second layer positioned above the first layer and formed of the second gain medium comprising one or more inorganic materials;
   a first spacer layer positioned between the first layer and the second layer; and
   wherein the first layer, the first spacer layer, and the second layer from a plurality of columnar structures, and wherein the columnar structures includes the first optical cavity situated about the first gain medium, the second optical cavity situated about the second gain medium, and the first spacer region contacting the first gain medium and the second gain medium.

3. The microscopy system of claim 2 wherein at least one of:
   the first optical cavity generates a different spectral peak than the second optical cavity;
   the first gain medium and the second gain medium have different specific gain spectrums;

the first gain medium and the second gain medium have at least one substantially different dimension; or the first optical cavity generates about the same spectral peak as the second optical cavity.

4. The microscopy system of claim 2 further comprising:
a third layer positioned above the second layer and formed of a third gain medium including one or more inorganic materials;
a second spacer layer positioned between the second layer and the third layer;
a fourth layer positioned above the third layer and formed of a fourth gain medium including one or more inorganic materials; and
a third spacer layer positioned between the third layer and the fourth layer.

5. A system comprising:
a microparticle formed from a columnar structure comprising:
a first optical cavity situated about a first gain medium;
a second optical cavity situated about a second gain medium; and
a first spacer region contacting the first gain medium and the second gain medium,
wherein the first optical cavity and the second optical cavity each generate laser light with a distinct spectral peak when energetically excited,
wherein the first gain medium, the first spacer region, and the second gain medium are epitaxially grown layers, and
wherein the first spacer region comprises an epitaxially grown semiconductor material that has a composition that allows the first spacer region to be selectively etched with respect to the first gain medium and the second gain medium without substantially affecting a volume or form of the first and second optical cavities.

6. The system of claim 5 wherein at least one of:
the first spacer region has a smaller cross-sectional area than the cross-sectional area of the first optical cavity and the second optical cavity;
the diameter of the first spacer region is smaller than those of the microdisks;
the length of the first spacer region between the first gain medium and the second gain medium is at least 150 nm;
the first spacer region is formed from an epitaxially grown layer originally positioned between a layer of the first gain medium and a layer of the second gain medium;
the columnar structure is attached to and extends from a substrate layer;
a sidewall angle of the columnar structure relative to the substrate layer is between 70° and 110°;
a mean diameter of the columnar structure is more than 0.5 pm, less than 3 pm, or between 0.5 µm and 3 µm;
an axial length of the columnar structure is less than 5 µm; or
the first optical cavity and the second optical cavity are semiconductor microdisks positioned concentrically.

7. The system of claim 5 wherein at least one of:
the first optical cavity generates a different spectral peak than the second optical cavity;
the first gain medium and the second gain medium have different specific gain spectrums;
the first gain medium and the second gain medium have at least one substantially different dimension; or
the first optical cavity generates about the same spectral peak as the second optical cavity.

8. The system of claim 5 wherein at least one of the distinct spectral peaks have linewidths of less than 0.5 nm or a wavelength of each distinct spectral peak is more than 0.4 µm, less than 1.9 µm, or between 0.4 µm and 1.9 µm.

9. The system of claim 5 further comprising:
a third optical cavity situated about a third gain medium; and
a second spacer region positioned between the second gain medium and the third gain medium.

10. The system of claim 5 further comprising a coating encapsulating at least the first optical cavity, the first spacer region, and the second optical cavity, wherein the coating allows the columnar structures to be wet etched without corroding the first optical cavity, the first spacer region, and the second optical cavity.

11. The system of claim 5 further comprising:
a pump light source;
a beam scanner;
a spectrometer including:
a resolution of less than 5 nanometers; and
an acquisition rate of more than 1 kilohertz;
a spectral analyzer configured to distinguish spectral peaks of laser output from broadband background due to fluorescence; and
a sample that contains one or more of the microparticle.

12. A method of making a plurality of photonic microparticles, the method comprising:
preparing a semiconductor wafer comprising:
a substrate layer;
a first layer positioned above the substrate layer and formed of a first gain medium including one or more inorganic materials;
a second layer positioned above the substrate layer and formed of a second gain medium including one or more inorganic materials;
a first spacer layer positioned between the first layer and the second layer,
wherein the first gain medium, the first spacer layer, and the second gain medium are epitaxially grown layers; and
etching the first layer, the first spacer layer, and the second layer to produce a plurality of columnar structures,
wherein the columnar structures extend from the substrate layer and each includes a first optical cavity situated about the first gain medium, a second optical cavity situated about the second gain medium, and a first spacer region contacting the first gain medium and the second gain medium,
wherein the first optical cavity and the second optical cavity each generate laser light with multiple distinct spectral peaks when energetically excited, and
wherein the first spacer region comprises an epitaxially grown semiconductor material that has a composition that allows the first spacer region to be selectively etched with respect to the first gain medium and the second gain medium without substantially affecting a volume or form of the first and second optical cavities.

13. The method of claim 12 further comprising separating the first optical cavity and the second optical cavity from the substrate layer and the first spacer layer.

14. The method of claim 12 wherein
the first optical cavity generates a different spectral peak than the second optical cavity.

15. The method of claim 12 further comprising at least one of:
- reducing a volume of the first spacer region through an etching process, wherein the first spacer region still contacts both the first optical cavity and the second optical cavity; or
- etching the first spacer region to remove the first spacer region, thereby releasing at least the second optical cavity from the columnar structure.

16. The method of claim 12 wherein at least one of:
the etching includes performing a wet etchant technique to etch the first spacer region;
the etching includes performing a dry etching of the first layer, the first spacer layer, and the second layer; or
epitaxially forming the first layer, the second layer, and the first spacer layer on the substrate.

17. The method of claim 12 wherein the semiconductor wafer further comprises:
- a third layer positioned above the second layer and formed of a third gain medium including one or more inorganic materials;
- a second spacer layer positioned between the second layer and the third layer;
- a fourth layer positioned above the third layer and formed of a fourth gain medium including one or more inorganic materials;
- a third spacer layer positioned between the third layer and the fourth layer; and further comprising:
- etching the third layer, the third spacer layer, and the fourth layer to produce a plurality of columnar structures, wherein the columnar structures extend from the second spacer layer and each includes a third optical cavity situated about the third gain medium, a fourth optical cavity situated about the fourth gain medium, and a third spacer region contacting the third gain medium and the fourth gain medium.

18. The method of claim 12 wherein at least one of:
etching the columnar structures is performed in a manner that causes the first optical cavity to have a different diameter than the second optical cavity;
etching the columnar structures includes applying a digital etch cycle of sequential steps of $H_2O_2$ immersion and $H_2SO_4$ immersion or $O_2$ plasma and $H_2SO_4$ immersion; or
etching the columnar structures is performed in a manner that causes the mean cross-sectional diameter or the vertical angles of the columnar structures to be deliberately varied across the substrate layer.

19. The method of claim 12 further comprising:
bonding the semiconductor wafer to a carrier wafer; and
removing the substrate layer from the bound semiconductor wafer prior to the method step of etching the first layer, the first spacer layer, and the second layer.

20. A method of emitting laser light within a biological sample, the method comprising:
placing one or more photonic particles in the biological sample, wherein the one or more of the photonic particles comprise:
- a first optical cavity situated about a first gain medium;
- a second optical cavity situated about a second gain medium;
- a first spacer region contacting both the first gain medium and the second gain medium;
- wherein the first optical cavity and second optical cavity each generate laser light with a distinct spectral peak when energetically excited, and the spectral peak generated by the first optical cavity is different than the spectral peak generated by the second optical cavity,
- wherein the first gain medium, the first spacer region, and the second gain medium are epitaxially grown layers, and
- wherein the first spacer region comprises an epitaxially grown semiconductor material that has a composition that allows the first spacer region to be selectively etched with respect to the first gain medium and the second gain medium without substantially affecting a volume or form of the first and second optical cavities; and energetically exciting or stimulating the photonic particles to cause the photonic particles to emit laser light.

* * * * *